US012483906B2

(12) United States Patent
Nagendran et al.

(10) Patent No.: US 12,483,906 B2
(45) Date of Patent: Nov. 25, 2025

(54) SIGNAL STRENGTH MAPPING FOR STEERING A CLIENT

(71) Applicant: QUALCOMM Incorporated, San Diego, CA (US)

(72) Inventors: Thanigaivel Nagendran, Chennai (IN); Vignesh Elumalai, Chennai (IN); Nitin Barattwaj Prabakar, Chennai (IN); Yashwanth Jayaprakash, Chennai (IN); Antony Sivi Siddharth Thomas, Chengalpatu DT (IN)

(73) Assignee: QUALCOMM Incorporated, San Diego, CA (US)

( * ) Notice: Subject to any disclaimer, the term of this patent is extended or adjusted under 35 U.S.C. 154(b) by 435 days.

(21) Appl. No.: 18/096,481

(22) Filed: Jan. 12, 2023

(65) Prior Publication Data
US 2024/0244448 A1 Jul. 18, 2024

(51) Int. Cl.
H04W 16/28 (2009.01)
H04B 17/318 (2015.01)
H04W 24/10 (2009.01)

(52) U.S. Cl.
CPC .......... H04W 16/28 (2013.01); H04B 17/318 (2015.01); H04W 24/10 (2013.01)

(58) Field of Classification Search
CPC ..... H04W 16/28; H04W 24/10; H04B 17/318
See application file for complete search history.

(56) References Cited

U.S. PATENT DOCUMENTS 10,313,936 B2 * 6/2019 Cui .............. H04W 48/20
10,419,335 B1 * 9/2019 Morris ............ H04L 45/64
10,820,263 B1 10/2020 Barton et al.
2005/0192031 A1 * 9/2005 Vare ............... G01S 5/0236
455/456.6
2021/0232610 A1 * 7/2021 Su .................. H04W 4/021
2021/0360504 A1 * 11/2021 Zhang .......... H04W 36/0009
(Continued)

FOREIGN PATENT DOCUMENTS

EP 3306984 B1 9/2020
EP 3542568 B1 * 7/2021 ............. H04B 7/04
GB 2616907 A * 9/2023 ............. G01C 21/34

OTHER PUBLICATIONS

International Search Report and Written Opinion—PCT/US2023/083243—ISA/EPO—Mar. 19, 2024.

*Primary Examiner* — Deepa Belur
(74) *Attorney, Agent, or Firm* — AVEK IP, LLC (QUALCOMM)

(57) ABSTRACT

This disclosure provides methods, components, devices and systems for steering a wireless device in a multi-AP environment based on target AP information. The target AP information includes signal strength data for a particular region in which the wireless device is located. The coverage areas of the multiple APs are each segmented into regions and a unique identifier is assigned to each region. When the wireless device is first eligible for steering in a particular region, it generates a measurement report which is associated with that region in a measurement map. When the wireless device is subsequently eligible for steering in that region, instead of generating another measurement report, the previously collected target AP information in the measurement map is used to steer the wireless device to a target AP.

30 Claims, 34 Drawing Sheets

(56) References Cited

U.S. PATENT DOCUMENTS

2022/0303723 A1* 9/2022 Khalid .................. H04W 48/16
2023/0171687 A1* 6/2023 Wu ...................... H04B 17/318
                                                         455/432.1

* cited by examiner

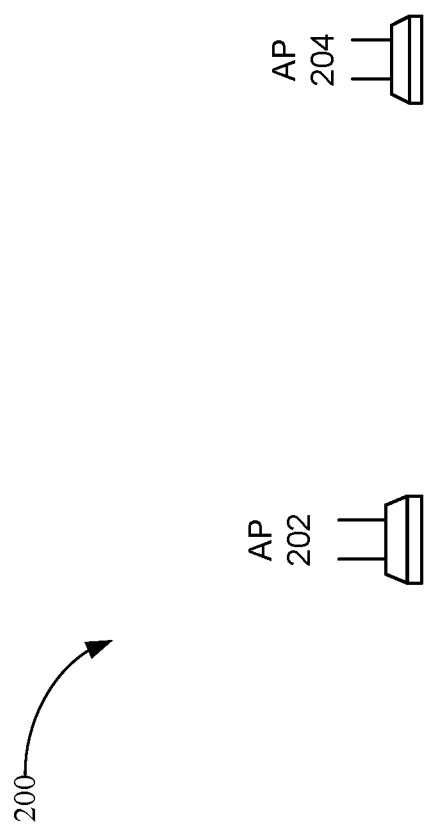

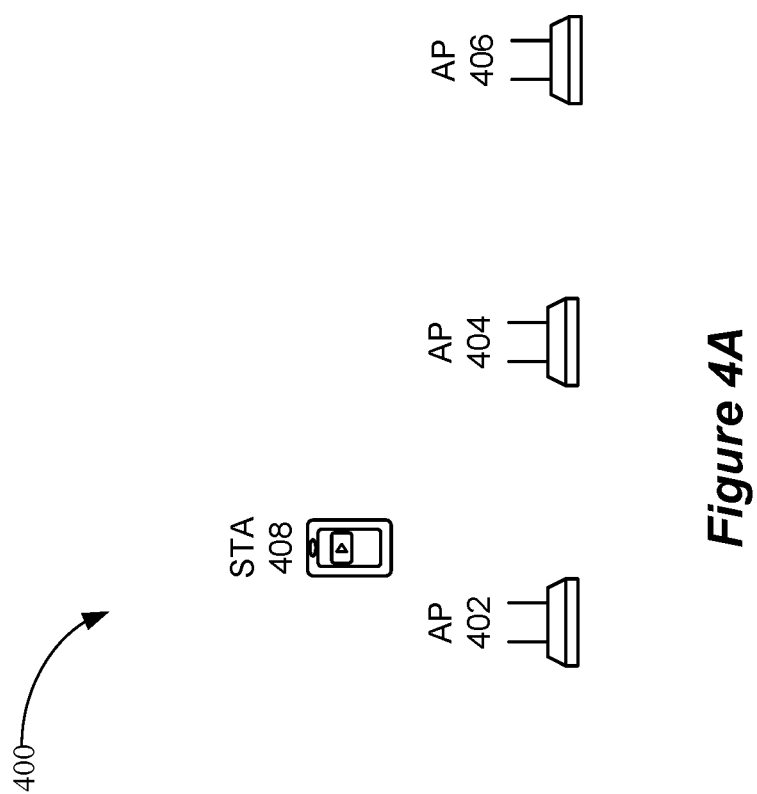

SIGNAL STRENGTH MAPPING FOR STEERING A CLIENT

TECHNICAL FIELD

This disclosure relates generally to wireless communication, and more specifically, to steering a client device in a multi-access point environment using signal strength data associated with a region.

DESCRIPTION OF THE RELATED TECHNOLOGY

A wireless local area network (WLAN) may be formed by one or more wireless access points (APs) that provide a shared wireless communication medium for use by multiple client devices also referred to as wireless stations (STAs). The basic building block of a WLAN conforming to the Institute of Electrical and Electronics Engineers (IEEE) 802.11 family of standards is a Basic Service Set (BSS), which is managed by an AP. Each BSS is identified by a Basic Service Set Identifier (BSSID) that is advertised by the AP. An AP periodically broadcasts beacon frames to enable any STAs within wireless range of the AP to establish or maintain a communication link with the WLAN.

In some implementations, multiple APs may be connected together to form an extended BSS (ESS). For example, many office and home wireless networks configured to operate as an ESS may include a root AP and a number of satellite APs such as relay or repeater APs. The root AP may provide a back-haul connection to other networks (such as the Internet), and the repeater APs may extend the effective wireless coverage area of the root AP. In some other implementations, multiple APs may be configured to operate as a mesh network. In a mesh network, the APs may be directly connected to each other in a non-hierarchical manner that allows the APs to cooperate with each other to efficiently route data to and from STAs. Some mesh networks can dynamically self-organize and self-configure, which may reduce installation overhead and allow for the dynamic load balancing in the network.

Typically, each STA is associated with a single AP (the "associated AP") at a time and relies upon its associated AP to receive data. In a multi-AP environment, the STA may be moved within the wireless network and may benefit by switching its association from the associated AP to one of a number of other APs ("candidate APs") that may offer better service than the associated AP.

SUMMARY

The systems, methods and devices of this disclosure each have several innovative aspects, no single one of which is solely responsible for the desirable attributes disclosed herein.

One innovative aspect of the subject matter described in this disclosure can be implemented in an access point (AP). The AP includes at least one memory. The AP includes at least one processor communicatively coupled with the at least one memory and operable to cause the AP to receive information about a second segmented coverage area associated with a second AP. The processor is operable to associate a unique identifier with each of a plurality of regions. The plurality of regions includes at least one region from a first segmented coverage area associated with the AP and at least one region from the second segmented coverage area. The processor is operable to cause the AP to receive target AP information associated with at least one of the plurality of regions. A wireless device is steered to a respective AP using the target AP information.

Another innovative aspect of the subject matter described in this disclosure can be implemented in a method performed by a first access point (AP) in a multi-AP environment. The method includes receiving information about a second segmented coverage area associated with a second AP. The method includes associating a unique identifier with each of a plurality of regions. The plurality of regions includes at least one region from a first segmented coverage area associated with the first AP and at least one region from the second segmented coverage area. The method includes receiving target AP information associated with at least one of the plurality of regions. A wireless device is steered to a respective AP using the target AP information.

Another innovative aspect of the subject matter described in this disclosure can be implemented in an access point (AP). The AP includes means for receiving information about a second segmented coverage area associated with a second AP. The AP includes means for associating a unique identifier with each of a plurality of regions. The plurality of regions includes at least one region from a first segmented coverage area associated with the AP and at least one region from the second segmented coverage area. The AP includes means for receiving target AP information associated with at least one of the plurality of regions. A wireless device is steered to a respective AP using the target AP information.

In some examples, the methods and APs may assign target AP information associated with a region to a neighboring region.

In some examples of the methods and APs, the target AP information associated with a region may include signal strength information. Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

FIG. 2A shows an example multi-AP wireless network environment having a first AP and a second AP.

FIG. 4A shows an example multi-AP wireless network environment having a first AP, a second AP, a third AP, and an STA.

Like reference numbers and designations in the various drawings indicate like elements.

DETAILED DESCRIPTION

Figure 1A:
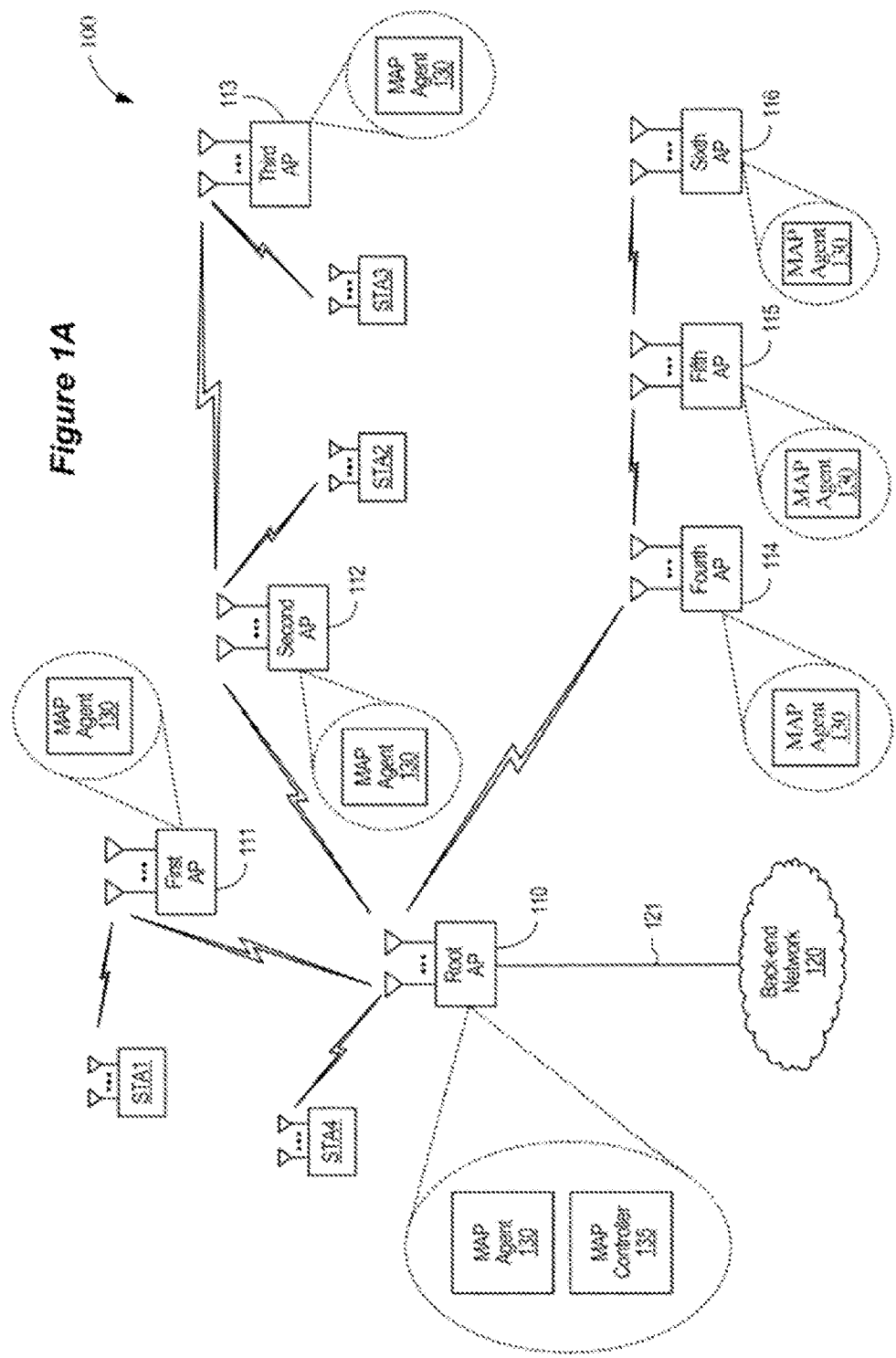
FIG. 1A shows an example multi-access point (AP) wireless network environment.

The following description is directed to some particular examples for the purposes of describing innovative aspects of this disclosure. However, a person having ordinary skill in the art will readily recognize that the teachings herein can be applied in a multitude of different ways. Some or all of the described examples may be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the $3^{rd}$ Generation Partnership Project (3GPP), among others. The described examples can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), spatial division multiple access (SDMA), rate-splitting multiple access (RSMA), multi-user shared access (MUSA), single-user (SU) multiple-input multiple-output (MIMO) and multi-user (MU)-MIMO. The described examples also can be implemented using other wireless communication protocols or RF signals suitable for use in one or more of a wireless personal area network (WPAN), a wireless local area network (WLAN), a wireless wide area network (WWAN), a wireless metropolitan area network (WMAN), or an internet of things (IOT) network.

Various aspects relate generally to wireless communications and more particularly to steering a wireless device in a multi-access point (AP) environment. Some aspects more specifically relate to steering a wireless device to or between one or more APs in the multi-AP environment. When the wireless device located in a given region of a multi-AP environment initially becomes eligible for steering, the AP associated with the wireless device sends an initial measurement request and the wireless device generates an initial measurement report. In settings where the APs in the multi-AP environment are stationary, additional measurement requests sent when the wireless device is subsequently eligible for steering in the given region and the responsive measurement reports include the same information as the initial measurement request and report. These redundant measurement requests and reports flood the medium and therefore lead to delayed steering and failed steering attempts.

Steering the wireless device to a "target AP" can be associated with target AP information. Target AP information can include information associated with a prior steering attempt. Target AP information can be included in a measurement report sent by the wireless device in response to a measurement request. The target AP information can include a signal strength of the wireless device in a given region with respect to the multiple APs in the environment, and as such, can identify the target AP for the given region. In aspects, the target AP for the given region is that AP of the multiple APs that has the best signal strength characteristics for that region with respect to the wireless device.

In some aspects, each AP in the multi-AP environment segments its respective coverage area into smaller regions or blocks and assigns a preliminary identifier to each region within its coverage area. The preliminary identifier may be a number or other identifier that is usable to identify the respective region. In some aspects, each AP communicates information about these regions, including the preliminary identifier associated with each region, to a multi-AP controller or root AP. As each AP may independently assign preliminary identifiers to the regions within its respective coverage area, the same preliminary identifier may be assigned to regions associated with coverage areas of multiple APs. In an aspect, the multi-AP controller or root AP consolidates the identifiers associated with each region such that each region within the coverage area of any AP is globally associated with a unique identifier. Information regarding each region, including the unique identifier thereof, can be communicated to each AP in the environment. Target AP information regarding each region obtained when the wireless device is initially eligible for steering in that region can be communicated to each AP and a measurement map can be populated that identifies the respective target AP for the regions. The wireless device within a particular region is steered using the target AP information that was generated in connection with a prior steering attempt. Using such techniques, the sending of additional and redundant measurement reports and requests each time the wireless device is eligible for steering can potentially be avoided.

Particular aspects of the subject matter described in this disclosure can be implemented to realize one or more of the following potential advantages. Measurement requests and reports generated each time the wireless device is eligible for steering can include redundant information. Segmenting the coverage area associated with each AP into smaller regions and associating a target AP with at least one of these regions in view of a measurement report sent by the wireless device in connection with a prior steering attempt can eliminate the need to generate a redundant measurement report in connection with each subsequent steering attempt. Reduction of these measurement reports and associated requests each time the wireless device is eligible for steering can free up the medium, thereby potentially allowing for faster handoff and improved user experience. Reduction of these redundant reports and associated requests can also increase the power efficiency of the wireless device.

In the following description, numerous specific details are set forth such as examples of specific components, circuits, and processes to provide a thorough understanding of the present disclosure. The term "coupled" as used herein means connected directly to or connected through one or more intervening components or circuits. The term "associated AP" or "serving AP" refers to an AP with which a given device (such as a client station (STA)) is associated (such as there is an established communication channel or link between the AP and the given STA). The term "non-associated AP" refers to an AP with which a given STA is not associated (such as there is not an established communication channel or link between the AP and the given STA, and thus the AP and the given STA may not yet exchange data frames). The non-associated APs may also be referred to herein as "candidate APs," and the terms "non-associated AP" and "candidate AP" may be used interchangeably herein.

The terms "goodput" and "throughput" may refer to an effective data rate of a wireless channel or link between two wireless devices (such as between a STA and an AP). The term "goodput" may be used interchangeably with the term "throughput" in the following description. For example, the goodput of an AP may be indicative of the available bandwidth of a wireless channel upon which the AP operates, and thus also may be indicative of the amount of traffic on the wireless channel.

A local network in a home, apartment, business, or other area may include a variety of devices that utilize the local network to communicate with each other or with devices in another network. For example, the local network may provide access for local devices to communicate to an upstream network (such as access to the Internet, via a broadband network). The local network (or local area network (LAN), sometimes also referred to as a wireless local area network (WLAN)), may include one or more access points (APs) to provide wireless coverage for the local network. The one or more APs may communicate with one another in a multiple AP (or multi-AP) environment. Each AP in the network may have different hardware capabilities (such as 2.4 GHz support, 5 GHz support, 6 GHz support, dual-band single radio support, dual band dual concurrent radios (DBDC) support, or the like) that may provide different options for wireless coverage. Each AP utilizes one or more channels within a frequency band. A channel may refer to a frequency (or range) used by the AP to communicate with devices that have a wireless association with the AP. Similarly, the devices utilize the channel to communicate (via a wireless association) with the AP. In some implementations, an AP may be equipped with more than one radio and may be capable of operating on more than one channel (such as a DBDC device).

Typically, one of the APs in the multi-AP environment may be a root AP, or central AP, while other APs make automatic path or routing selection using a logical topology between each of the other APs and the root AP. A local network which is capable of coordinating between two or more APs to manage a topology or aggregate wireless coverage area may be referred to as a self-organizing network (SON). In such implementations, a SON protocol may be used between the two or more APs to coordinate wireless channel configurations or other implementation settings.

A device may select the associated AP (or the associated AP may be selected for the device) from multiple APs in the multi-AP environment. The selection of the associated AP may be associated with or based on signal strengths of wireless signals or estimating, or measuring, the highest goodput received from each of the multiple APs. In addition to, or alternatively from, section of an AP, a frequency band may be selected. For example, the device may select a 2.4 GHz, 5 GHz or 6 GHz frequency band from the frequency bands available for communication between the device and the APs.

Typically, a device may select a first AP and frequency band of the first AP using the information available to the device, however, the first AP (or a logical entity that implements logic for controlling the operation of a network having multiple APs, such as a Multi-AP Controller) may have access to more information regarding topology and performance of the APs in the network than is available to the device. As such, the first AP may optimize the network or improve service for the STA by steering the STA to a different AP (which would become the new associated AP for the STA). Steering refers to any activity which causes the STA to wirelessly associate with a second AP instead of maintaining the association with a first AP. Steering also may be referred to as a re-association activity, move, transfer, relocate, transition, switch, re-position, handover, or the like. Steering may but does not necessarily involve physical or geographic movement of the STA. In a mesh network implementation, steering can involve seamlessly handing off a STA from one AP to another without changes in layer 7 connectivity (that is, the IP address of the steered STA may not change with steering).

There may be various reasons for steering the device. For example, the device may be steered to a different AP to perform load balancing in the network. In another example, because higher-frequency wireless signals typically have shorter range than lower-frequency wireless signals, a device that is moving away from a dual-band AP may obtain better throughput by switching from a higher frequency band to a lower frequency band (such as switching from the 5 GHz frequency band to the 2.4 GHz frequency band). In yet another example, although higher-frequency wireless signals may have higher data rates than lower-frequency wireless signals, if the higher frequency band is congested, then the device may obtain better throughput by switching from the higher frequency band to a lower frequency band that is less congested. Other factors or conditions for steering a device may include backhaul performance, network topology, performance characteristics (such as throughput, goodput, bandwidth, latency, errors, jitter, and the like), locations of newly connected devices, intensity of communication between devices and an AP (such as bandwidth, bursting, types of traffic, and the like), assigned priorities of the devices, a change in quality of service (QoS), other performance requirements of the device, or a BSS capability of the AP may change.

FIG. 1A shows an example multi-AP wireless network 100 environment. The wireless network 100 includes a number of APs and STAs, such as AP 110-AP 116 and STA 1-STA 4. The APs 110-116 may form a wireless local area network (WLAN) that allows the APs 110-116 and the stations STA1-STA4 (and potentially other wireless communication devices) to communicate with each other over a shared wireless medium. The shared wireless medium may be divided into a number of channels, may be divided into a number of resource units (Rus), or both. The APs 110-116 may each include an assigned unique MAC address that is programmed therein by, for example, the manufacturer of the access point. Similarly, each of the stations STA1-STA4 also may be assigned a unique MAC address. In some implementations, the wireless network 100 may correspond to a multiple-input multiple-output (MIMO) wireless network and may support single-user MIMO (SU-MIMO) and multi-user (MU-MIMO) communications. In some implementations, the wireless network 100 may support orthogonal frequency-division multiple access (OFDMA) communications.

The wireless network 100, or wireless communication network, in addition to an example of a WLAN, also can be an example of a wireless personal area network (PAN). In some implementations, the wireless network 100 is a Wi-Fi network and defined by the IEEE 802.11 family of standards. In some other implementations, the wireless network 100 is an example of a Bluetooth® network and the stations STA1-STA4 are Bluetooth®-compliant devices. In some additional implementations, the wireless network 100 can include one or more of the following wireless communication technologies: Bluetooth Low Energy (BLE), BLE mesh, ZigBee, Low Power IoT, LTE or 5G. Furthermore, in some implementations, the wireless network 100 can be implemented as a hybrid network, and can support both wired and wireless communication technologies, multiple wired communication technologies, or multiple wireless communication technologies. For example, one or more of the APs 110-116 can support both IEEE 802.11 and powerline communication (PLC) protocols. In some other examples, the APs 110-116 can support a combination of IEEE 802.11 and PLC protocols, a combination of IEEE 802.11 and coaxial cable (Coax) based communication protocols, a combination of IEEE 802.11 and Ethernet based communication protocols, a combination of IEEE 802.11 and Bluetooth communication protocols, a combination of IEEE 802.11 and LTE communication protocols, a combination of IEEE 802.11 and 5G communication protocols, and various other suitable combinations.

In some implementations, the wireless network 100 can be implemented as an ad hoc, peer-to-peer (P2P), or mesh network. For example, the wireless network 100 may be an example of an EasyMesh network. An EasyMesh network is a mesh network that operates in accordance with the Wi-Fi Alliance (WFA) standard specifications for routing traffic in multi-AP environments. For example, an EasyMesh network may operate in accordance with the WFA EasyMesh Specification version 5.0 (2022), a subsequent or previous generation of the EasyMesh standard specification, or both.

Each of the stations STA1-STA4 may be referred to as a mobile station (MS), a mobile device, a mobile handset, a wireless handset, an access terminal (AT), a user equipment (UE), a subscriber station (SS), or a subscriber unit, among other examples. Each of the stations STA1-STA4 may represent various devices such as mobile phones, personal digital assistant (PDAs), other handheld devices, netbooks, notebook computers, tablet computers, laptops, chromebooks, extended reality (XR) headsets, wearable devices, display devices (for example, TVs (including smart TVs), computer monitors, navigation systems, among others), music or other audio or stereo devices, remote control devices ("remotes"), printers, kitchen appliances (including smart refrigerators) or other household appliances, key fobs (for example, for passive keyless entry and start (PKES) systems), Internet of Things (IoT) devices, and vehicles, among other examples.

The APs 110-116 may be any suitable device that allows one or more of stations STA1-STA4 to connect to the wireless network 100 or another network (such as a local area network (LAN), wide area network (WAN), metropolitan area network (MAN), or the Internet).

In some implementations, each of the APs 110-116 may periodically broadcast beacon frames to enable the stations STA1-STA4 and other wireless devices within their wireless ranges to establish and maintain a communication link with the respective one of the APs 110-116. The beacon frames, which are typically broadcast according to a target beacon transmission time (TBTT) schedule, may include timing synchronization function (TSF) values of one or more of the APs 110-116. The stations STA1-STA4 may synchronize their own local TSF values with the broadcast TSF values, for example, so that all the stations STA1-STA4 are synchronized with each other and with the APs 110-116. In some aspects, the beacon frames may indicate downlink (DL) data transmissions to the stations STA1-STA4, and may solicit or schedule uplink (UL) data transmissions from the stations STA1-STA4.

In some implementations, the AP 110 may operate as a root AP (RAP), and each of the APs 111-116 may operate as satellite APs (SAPs) (such as relay, repeater or range extender APs). The root AP 110 may facilitate communications between the root AP 110 and the satellite APs 111-116, and also may facilitate communications between the WLAN and other networks or systems. In some aspects, the root AP 110 may be connected via a wired connection 121 (such as through an Ethernet or PLC), or alternatively, via a wireless connection, or even a hybrid communication link, to a back-end network 120 such as, for example, a LAN, WAN, MAN, a communication service provider network, the Internet, or any combination thereof. The root AP 110 may be a central access point (CAP) or router which is communicatively coupled to the back-end network 120, or broadband network. Alternatively, the root AP 110 may be separate or collocated with a gateway device. A gateway device, such as a modem or router, may provide access to the back-end network 120. For example, the gateway device can couple to the back-end network 120 through a cable, a fiber optic, a powerline, or DSL network connection. The root AP 110 may be connected to each of the satellite APs 111-116 via a wireless connection, a wired connection, or both.

In some implementations, the root AP 110 may be or may include a multi-AP (MAP) agent 130 and a MAP controller 135. The MAP agent 130 may allow the root AP 110 to provide wireless services to a number of client devices (such as the stations STA1-STA4) and to communicate with one or more of the APs 111-116. The MAP controller 135 may coordinate channel planning for the APs 110-116 and their associated client devices, and may configure one or more aspects of the downstream APs 111-116. For example, the MAP controller 135 may directly provide wireless services to the fourth station STA4.

Although depicted in the example of FIG. 1A as being part of the root AP 110, the MAP controller 135 may be separate from the root AP 110. In some other implementations, the root AP 110 may include the MAP controller 135 but may not include the MAP agent 130 (and may not provide wireless service to client devices such as the stations STA1-STA4).

Each of the satellite APs 111-116 may be or may include a MAP agent 130 that allows the satellite APs 111-116 to provide wireless services to a number of client devices (such as the stations STA1-STA4). The MAP agent 130 also may allow the corresponding satellite APs 111-116 to communicate with downstream satellite APs or with upstream satellite APs (or both). For example, the MAP agent 130 may directly provide wireless services to the fourth station STA4. In some implementations, the satellite APs 111-116 may be used to extend the wireless coverage area of the root AP 110, for example, by operating as relay devices or range extender devices.

For the example wireless network 100 of FIG. 1A, the first station STA1 is currently associated with the first AP 111, the second station STA2 is currently associated with the second AP 112, the third station STA3 is currently associated with the third AP 113, and the fourth station STA4 is currently associated with the root AP 110. In some implementations, each of the root AP 110 and the satellite APs 111-116 may define its own Basic Service Set (BSS), and all client devices associated with a given AP may be included within the BSS of a given AP. In some other implementations, the root AP 110 and a group of the satellite APs 111-116 may form an Extended Basic Services Set (ESS), and all client devices associated with the root AP 110 and the group of the satellite APs 111-116 may be included within the ESS.

The MAP controller 135 may be used to assign operating channels for the root AP 110 and for one or more of the satellite APs 111-116 in a manner that optimizes network performance by considering the impact that each of the satellite APs 111-116 (as well as their respective client devices) may have on the network. In some implementations, the MAP controller 135 may provide centralized channel selection planning for the network in view of a number of network parameters observed by one or more of the satellite APs 111-116. The network parameters may include, for example, channel conditions, interference, traffic loads, traffic patterns, service needs of client devices, available channels, and other network utilization information observed by one or more of the satellite APs 111-116. In some aspects, the satellite APs 111-116 may obtain, select, ascertain or determine one or more network parameters and transmit the obtained, selected, ascertained or determined network parameters to the root AP 110.

In some implementations, the root AP 110 may use the MAP controller 135 to ascertain, determine, or establish that one or more of the stations STA1-STA4 are eligible for steering. In some examples, the MAP controller 135 may ascertain, determine, or establish that one or more of the stations STA1-STA4 are eligible for steering when a signal strength of the AP associated with the respective STA goes below or is equal to a signal strength threshold (also referred to as a "steering eligibility threshold"). The MAP controller 135 may ascertain, determine, or establish that an STA (such as one of STA1-STA4) is eligible for steering when that STA moves away from its associated AP such that the signal strength of the associated AP goes below or is equal to the steering eligibility threshold. Or, for example, the MAP controller 135 may ascertain, determine, or establish that an STA is eligible for steering when an obstruction or interference degrades wireless communications between the associated AP and the STA to cause the signal strength of the associated AP to go below or equal the steering eligibility threshold. The steering eligibility threshold may be set by the manufacturer of the APs or may be configured by a user. In some examples, the steering eligibility threshold may be adaptively modified, such as by the MAP controller 135, in view of network conditions and configuration.

In some implementations, the MAP controller 135 may steer an STA eligible for steering from its associated AP to a candidate AP in cases in which the signal strength of the candidate AP is greater than the signal strength of the associated AP. A candidate AP to which the STA is to be steered (for example, because the signal strength of the candidate AP is greater than the signal strength of the associated AP) may also be referred to herein as a "target AP."

In some implementations, the MAP controller 135 may steer an STA in association with or based on one or more additional or other factors, for example, changes in load balance on the APs 110-116, changes in traffic patterns of the network, changes in locations of the stations STA1-STA4, changes in bandwidth or service needs of the stations STA1-STA4, changes in channel conditions, changes in interference, changes in operating channels, changes in capacities of the APs 110-116, changes in available airtime for the APs 110-116, or any combination thereof. In addition, or in the alternative, the root AP 110 may use the MAP controller 135 to generate one or more channel selection plans for the network. The channel selection plans may be used to dynamically assign operating channels to the APs 111-116 in a manner that considers the impact that each of the APs 111-116 (as well as their respective client devices) may have on the network, thereby optimizing network performance.

The steering algorithms may be associated with a wireless protocol (such as an IEEE 802.11 protocol). In some aspects, the steering algorithms may be associated with measurement requests transmitted to the STA, such as transmitted to the STA by the associated AP or the MAP controller 135, and the reports generated by the STA in response. In some examples, the steering algorithms may be associated with or based on the IEEE 802.11k protocol. APs operating in accordance with the IEEE 802.11k protocol may employ measurement requests to solicit measurements from an STA when that STA is eligible for steering, such as when the signal strength of the associated AP is equal to or below the steering eligibility threshold. A measurement request transmitted to an STA in accordance with the IEEE 802.11k protocol may include, for example, the channel and the BSSID associated with the root AP, which, in mesh networks, may be the same channel and BSSID that is associated with each of the candidate APs. The STA may generate a report in response to the measurement request and transmit the report to the associated AP, the MAP controller 135, or both. The report may include the Received Signal Strength Indicator (RSSI) or like information for the associated AP and the candidate APs associated with that BSSID. The steering algorithm may steer the STA from the associated AP to a candidate AP in cases in which the RSSI of the candidate AP is better than the RSSI of the associated AP. The measurement requests and responsive reports generated in accordance with the IEEE 802.11k protocol may also be referred to herein as 11k requests and 11k reports, respectively. In some implementations, the measurement reports may additionally or alternately include smart monitor reports.

In some aspects, the steering algorithms may employ the IEEE 802.11mc protocol. The IEEE 802.11mc protocol enables two wireless devices (such as an STA and an AP) to cooperatively estimate the distance between them. For example, the two devices may estimate the distance between them by measuring a round trip time (RTT). To measure the RTT, an STA and an AP may exchange bursts of messages with each other. Both the STA and the AP may record the time of departure (TOD) of the message and the time of arrival (TOA) of the message, and the TOA and the TOD may be used to calculate the RTT. Once the RTT has been calculated, the distance between the devices may be calculated using the RTT and the speed of light.

In some implementations, the APs 110-116 may be configured to operate as a mesh network, such as an EasyMesh network that operates in accordance with the WFA EasyMesh Specification version 5.0 (2022) or a subsequent or previous generation of the EasyMesh standard specification, or another mesh network. In a mesh network, the APs 110-116 may be directly connected to each other wirelessly in a non-hierarchical manner that allows the APs to cooperate with each other to efficiently route data to and from STAs. Some mesh networks may be referred to as Self-Organizing Networks (SONs). In a SON topology, the root AP 110 and the APs 111-116 do not need to be outfitted with a MAP agent 130, nor a MAP controller 135. In some mesh network implementations, the root AP 110, or any of the APs 111-116, can be implemented as a SON Controller. In some implementations, the SON Controller may be configured to serve similar functions as the MAP controller described herein.

In some implementations, one or more of the APs 110-116 may monitor the channel conditions of the channel currently used by the APs 110-116 in the wireless network 100. If the root AP 110 (in a root and satellite AP configuration), or another AP (in a mesh or SON configuration), ascertains, determines, or establishes that better goodput may be possible on another channel or frequency band (such as due to traffic on the current channel, channel interference caused by a neighboring wireless network, and so on), the root AP 110, or the other AP, may switch channels, for example, by broadcasting a channel switch announcement. In response thereto, the APs 111-116 may coordinate their channel switching operations with the root AP 110, or the other AP. Because the stations STA1-STA4 may need to re-associate with their respective associated APs when switching channels, the root AP 110, or other AP, may select or schedule a time to initiate the channel switch operation based, at least in part, on one or more characteristics of the traffic flows associated with the stations STA1-STA4, for example, to minimize service interruptions caused by channel switch operations.

Figure 1B:
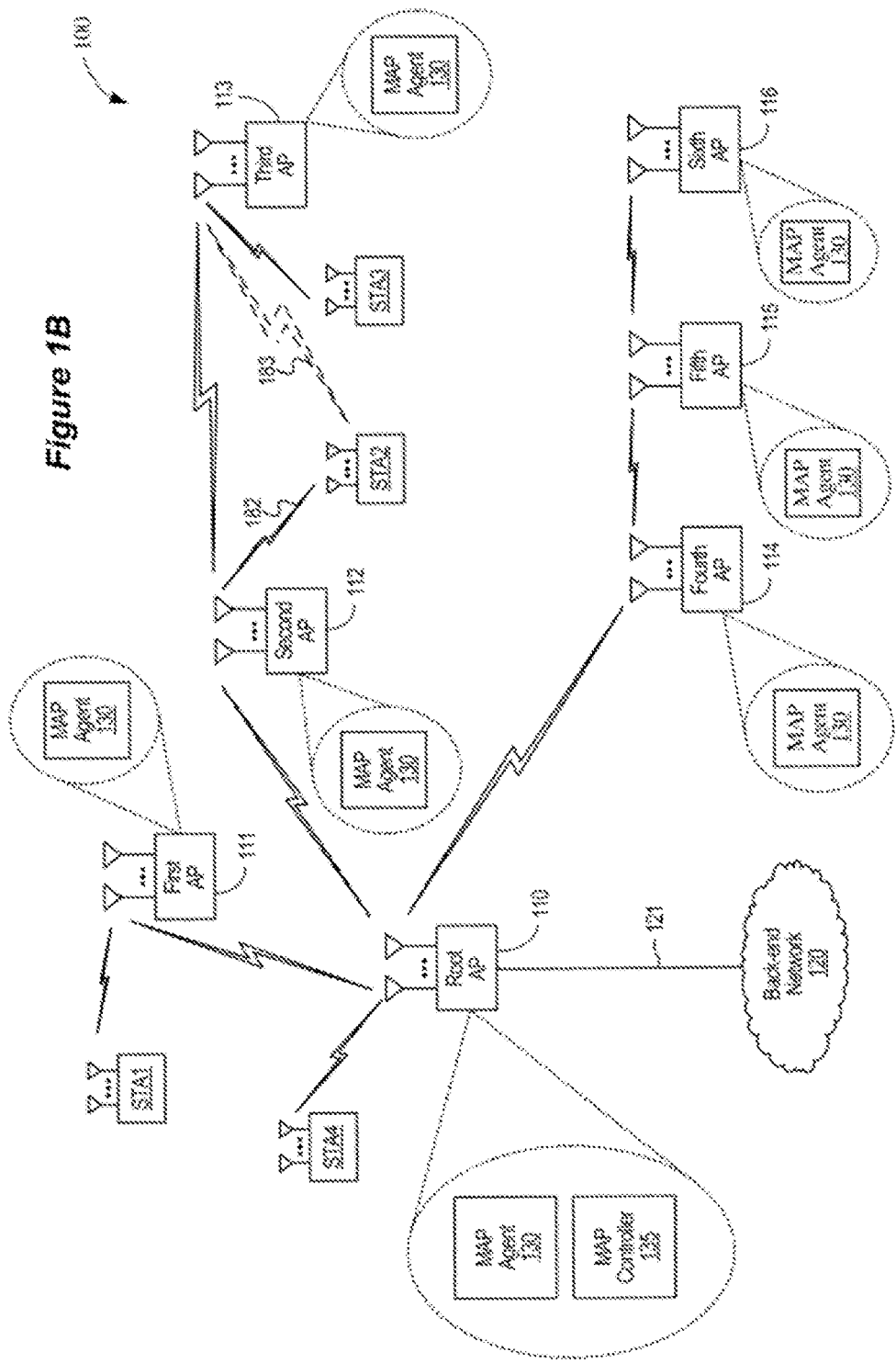
FIG. 1B shows an example multi-AP wireless network environment employing client steering.

FIG. 1B shows an example multi-AP wireless network 100 environment employing client steering. The wireless network 100 is similar to the wireless network 100 described with respect to FIG. 1A, and includes the same APs 110-116 and stations STA1-STA4. As depicted in FIG. 1B, the first station STA1 is currently associated with the first AP 111, the second station STA2 is currently associated with the second AP 112, the third station STA3 is currently associated with the third AP 113, and the fourth station STA4 is currently associated with the root AP 110.

STA2 is initially associated with the second AP 112 via an association 182, such as fronthaul channel 182. As STA2 becomes eligible for steering, such as when it moves away from the second AP 112 such that the signal strength of STA2 with respect to the second AP 112 equals or falls below the steering eligibility threshold, the second AP 112 may send STA2 a measurement request. The measurement request may be, for example, an 11k request that includes the BSSID and the associated frequency channel. STA2 may generate and transmit to the second AP 112 a responsive report, such as an 11k report, which includes the signal strength of the second AP 112 and the other candidate APs 110, 111, 113, 114, 115, and 116 for that channel. The report may include additional information, such as information that allows the second AP 112 or the MAP controller 135 to ascertain, determine, or establish whether to generate a channel switch announcement. In the example of FIG. 1B, the 11k report indicates the signal strength of the third AP 113 is better than the signal strength of the second AP 112. The second AP 112 may therefore steer (or together with the MAP controller 135 facilitate the steering of) STA2 to the third AP 113. More specifically, the second AP 112 may drop the first fronthaul channel 182 to the second station STA2 and cause the second station STA2 to establish a wireless association over a second fronthaul channel 183 to the third AP 113.

In an aspect, each AP in a multi-AP environment may estimate its respective coverage area. Each AP may segment its respective estimated coverage area and may assign a preliminary identifier to each segment or region of the segmented coverage area. The preliminary identifiers associated with the regions of the multiple segmented coverage areas may be communicated to the root AP, such as to the MAP controller. The MAP controller may consolidate the preliminary identifiers and assign a globally unique identifier to each region of each segmented coverage area. In some aspects, assigning a unique identifier to each region of each segmented coverage area may involve overriding at least one preliminary identifier associated with an overlapping region (that is, a region associated with segmented coverage areas of more than one AP). The root AP (such as the MAP controller associated with the root AP) may communicate the unique identifier of each region to each AP in the multi-AP environment. Signal strength data generated when a wireless device is initially eligible for steering may be associated with at least some of the regions. This signal strength data of a region may be used to make steering decisions when the wireless device subsequently becomes eligible for steering in that region.

FIG. 2A shows an example multi-AP wireless network environment 200 having a first AP 202 and a second AP 204. The wireless network environment (or network) 200 may be mesh network, such as an EasyMesh network or another mesh network. In aspects, the first AP 202 may be an example of the root AP 110 of FIG. 1A and include a MAP controller and a MAP agent. The second AP 202 may be an example of any one of APs 111-116 of FIG. 1A. In some implementations, the network 200 may be a SON; in these implementations, the first AP 202 may be devoid of a MAP controller and each AP 202 and 204 may be outfitted with a SON controller configured generally to perform the functions of a MAP controller.

Figure 2B:
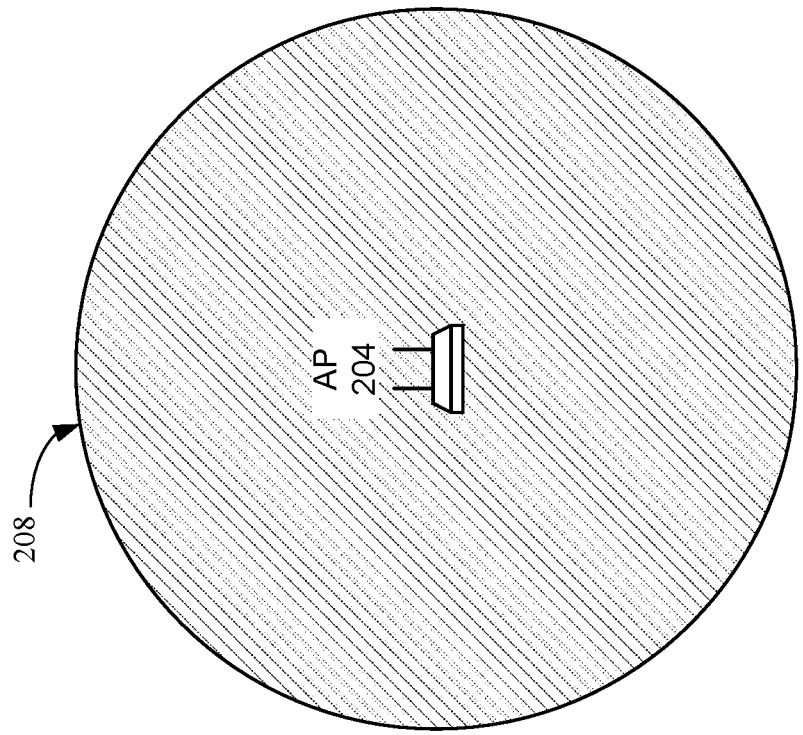
FIG. 2B shows an example of the first AP and the second AP each respectively estimating a first coverage area and a second coverage area associated with the first AP and the second AP.
Figure 2B:
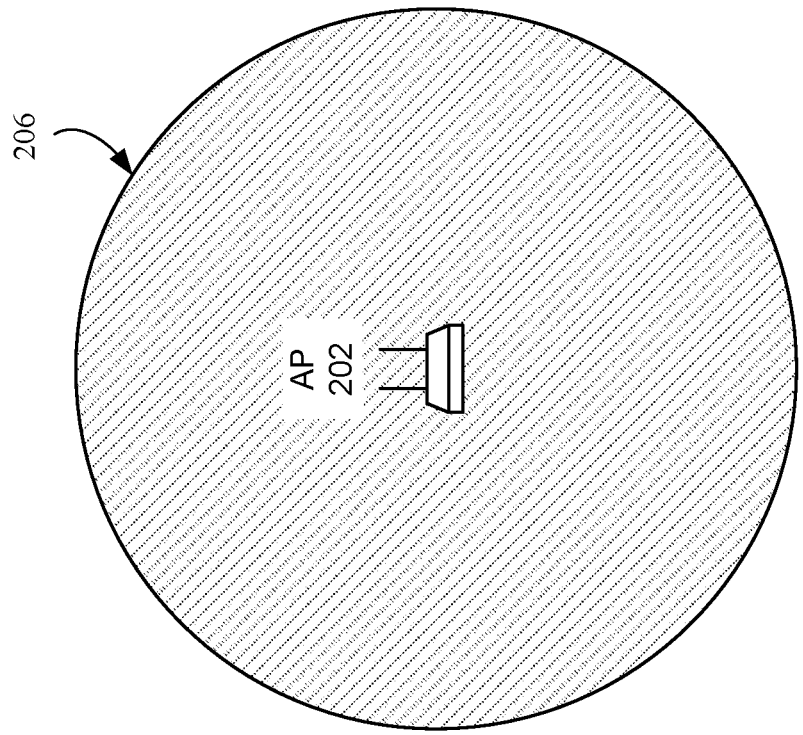

FIG. 2B shows an example of the first AP and the second AP each respectively estimating a first coverage area 206 and a second coverage area 208 associated with the first AP 202 and the second AP 204. Each of the first AP 202 and the second AP 204 may estimate its respective coverage area 206 and 208 using one or more of any number of suitable coverage area estimation techniques. For example, each of the first AP 202 and the second AP 204 may use Wi-Fi sensing to estimate its respective coverage area 206 and 208 by obtaining channel state information (CSI) to characterize the environment 200. Or, for instance, each of the first AP 202 and the second AP 204 may employ IEEE 802.11 me techniques, such as a fine-time measurement (FTM) protocol, to characterize the environment 200 by measuring the RTT of signals. Alternately or in addition, each of the first AP 202 and the second AP 204 may estimate its respective coverage area 206 and 208 by assessing its transmission power (Tx power), antenna positions, or both. In some examples, each of the first AP 202 and the second AP 204 may estimate its respective coverage area 206 and 208 by using heat maps or other suitable techniques. The technique(s) used by the first AP 202 to estimate its coverage area 206 and the technique(s) used by the second AP 204 to estimate its coverage area 208 may be disparate, and may, for instance, depend on the capabilities of the respective AP. For example, AP 202 may employ Wi-Fi sensing or the IEEE 802.11mc protocol to estimate its coverage area 206 in cases in which AP 202 supports Wi-Fi sensing or the IEEE 802.11mc protocol. Alternately, if AP 204 does not support either Wi-Fi sensing or the IEEE 802.11 me protocol, the AP 204 may employ a Tx power, antenna position, or a different technique to estimate its coverage area 208.

In the example shown in FIG. 2B, AP 202 has estimated its coverage area to be the coverage area 206 and AP 204 has estimated its coverage area to be the coverage area 208. While FIG. 2B shows the coverage areas 206 and 208 are symmetrical (each is a circle in this example), one having skill in the art will understand that such is merely an example and that the coverage areas 206 and 208 may be estimated to be of any regular or irregular shape. Further, one coverage area (such as coverage area 206) may be of a different size or shape than another coverage area (such as coverage area 208).

Figure 2C:
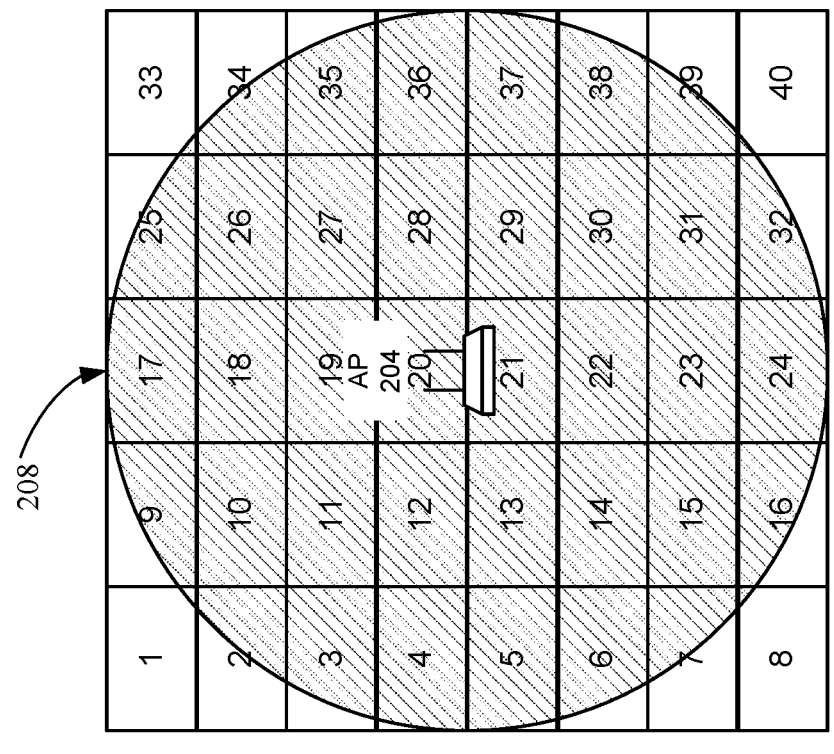
FIG. 2C shows an example of the first AP and the second AP each respectively segmenting the first coverage area and the second coverage area.
Figure 2C:
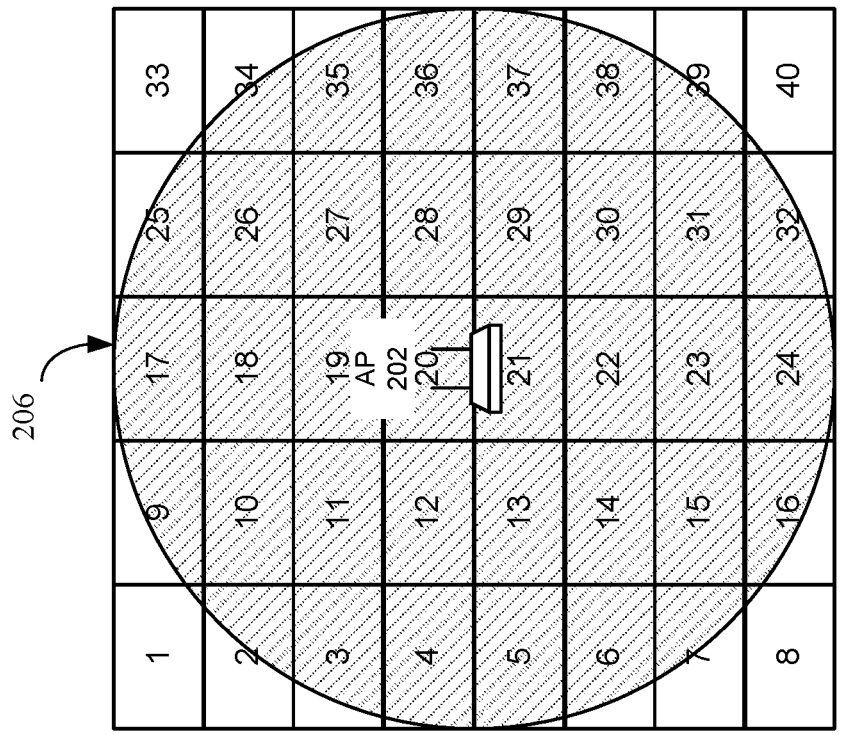

FIG. 2C shows an example of the first AP 202 and the second AP 204 each respectively segmenting the first coverage area 206 and the second coverage area 206. Each of the first AP 202 and the second AP 204 may further assign a preliminary (or temporary) identifier 1-n to each region. In the example shown in FIG. 2C, the first AP 202 has segmented its coverage area 206 into regions and has assigned one preliminary identifier 1-40 to each region. The second AP 204 has likewise segmented its coverage area 208 into regions and has assigned a preliminary identifier 1-40 to each region. The first AP 202 and the second AP 204 may employ any suitable locational technique(s) to segment their respective coverage areas and identify the location of each region within the coverage area, such as RTT measurements, measurements taken from a global positioning system (GPS) or other sensor associated with the AP, and techniques associated with the IEEE 802.11mc protocol.

Each region 1-40 of the respective segmented coverage areas 206 and 208 may also be referred to herein as a segment, block, or section, and these terms may be used interchangeably herein. The rectangular shape of each region 1-40 shown in FIG. 2C is merely an example and is not intended to be limiting. In some examples, one or more of regions 1-40 may take on another shape (such as a circle, a square, a triangle, or other regular or irregular shapes). The shape, size, and number of regions in a coverage area may depend on one or more factors (such as on the shape or size of the coverage area, the number of APs and STAs, and the network characteristics), and as discussed herein, may be adaptively modified. In an aspect, the shape and size of the regions 1-40 may be user-configurable.

Figure 2D:
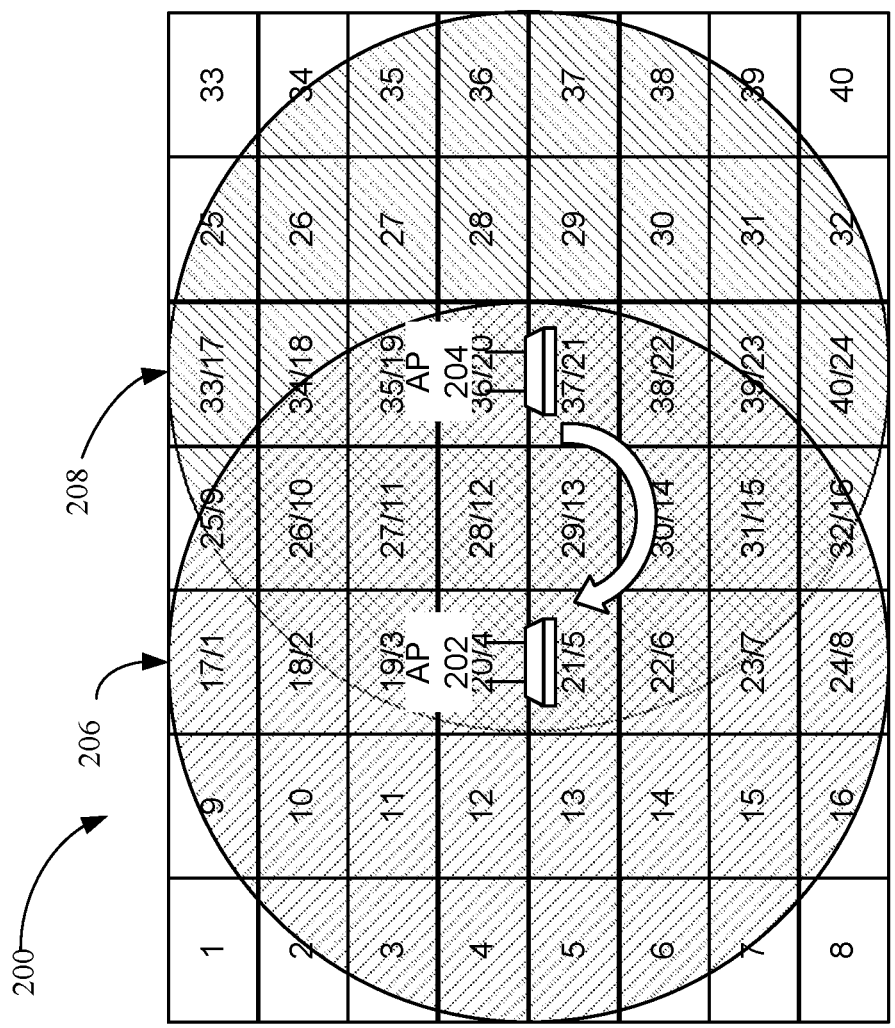
FIG. 2D shows an example of the second AP sharing information about the second segmented coverage area with the first AP.

FIG. 2D shows an example of the second AP 204 sharing information about the second segmented coverage area 208 with the first AP 202. The information transmitted by the second AP 204 to the first AP 202 may include location data associated with each region 1-40 of the second segmented coverage area 208 (such as geographical coordinates, the location of one region relative to another region, and the dimensions of the regions) and the preliminary identifier 1-40 thereof.

The coverage areas 206 and 208 in the environment 200 may overlap each other (see FIG. 2D). Specifically, in this example, the regions of the first coverage area 206 preliminarily identified as regions 17-40 overlap regions of the second coverage area 208 preliminarily identified as regions 1-24. Each of these overlapping regions may have more than one identifier associated therewith. For example, the region associated with preliminary identifier 17 of the first coverage area 206 is also associated with preliminary identifier 1 of the second coverage area 208 (i.e., "17/1"), the region associated with preliminary identifier 18 of the first coverage area 206 is also associated with preliminary identifier 2 of the second coverage area 208 (i.e., "18/2"), and so on. Further, the same preliminary identifier may be associated with two disparate regions (for instance, the preliminary identifier 31 is associated with an overlapping region (i.e., "31/15") and another region associated solely with the second coverage area 208). Thus, a preliminary identifier may not necessarily identify each region of each segmented coverage area 206 and 208 uniquely.

Figure 2E:
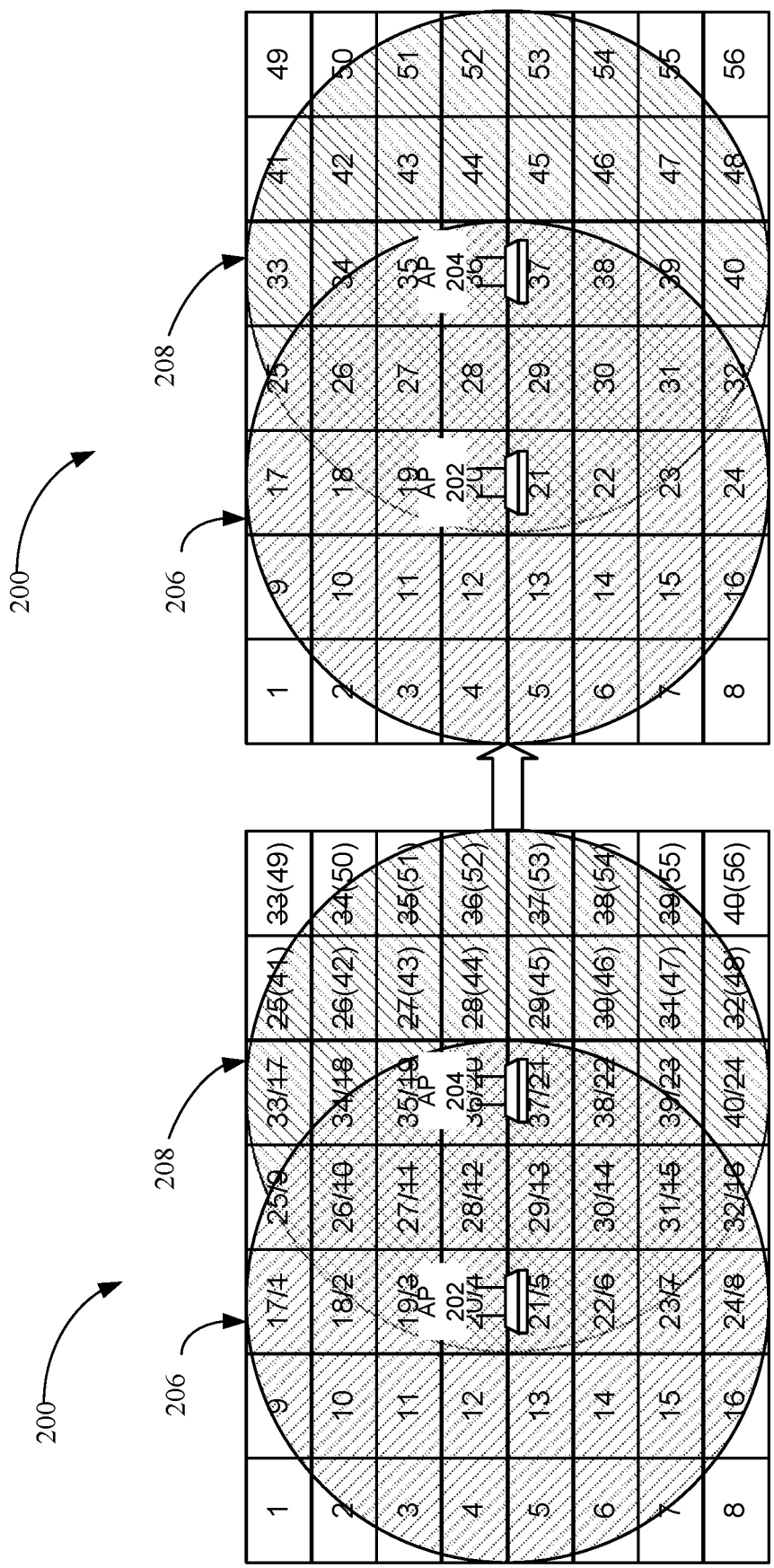
FIG. 2E shows an example of the first AP consolidating identifiers of the first segmented coverage area and the second segmented coverage area.

FIG. 2E shows an example of the first AP 202 consolidating identifiers of the first segmented coverage area 206 and the second segmented coverage area 208. Specifically, the first AP 202 may assign a globally unique identifier to each region of each coverage area 206 and 208 to enable unique identification of each region. In the example of FIG. 2E, at left, the first AP 202 disassociates from each overlapping region the preliminary identifier assigned with the region by the second AP 204. For instance, the first AP 202 may cause the region associated with preliminary identifier 17 by the first AP 202 and with preliminary identifier 1 by the second AP to be disassociated from the preliminary identifier 1 assigned to that region by the second AP 202 (as illustrated by identifier 1 that is struck through). Similarly, the first AP 202 may cause the regions respectively associated with preliminary identifiers 18-40 by the first AP 202 and with preliminary identifiers 2-24 by the second AP to be disassociated from the preliminary identifiers 2-24 assigned by the first AP 202. The first AP 202 may also renumber the remaining regions associated with the second AP 204 sequentially (for example, the region initially associated with the preliminary identifier 25 by the second AP 206 may be assigned identifier 41 by the first AP 202 such that it in sequence with the last region 40 of the first segmented coverage area, and so on). In this way, the identification scheme for the regions may be consolidated. By consolidating the segment or region identifiers in this manner, as shown in FIG. 2E at right, the first AP 202 may assign or cause to assign a globally unique identifier 1-56 to each region to allow for each region (including overlapping regions) to be uniquely identified. The consolidated identifiers for some regions (such as regions 1-16) may be the same as the preliminary identifiers associated with those regions.

Figure 2F:
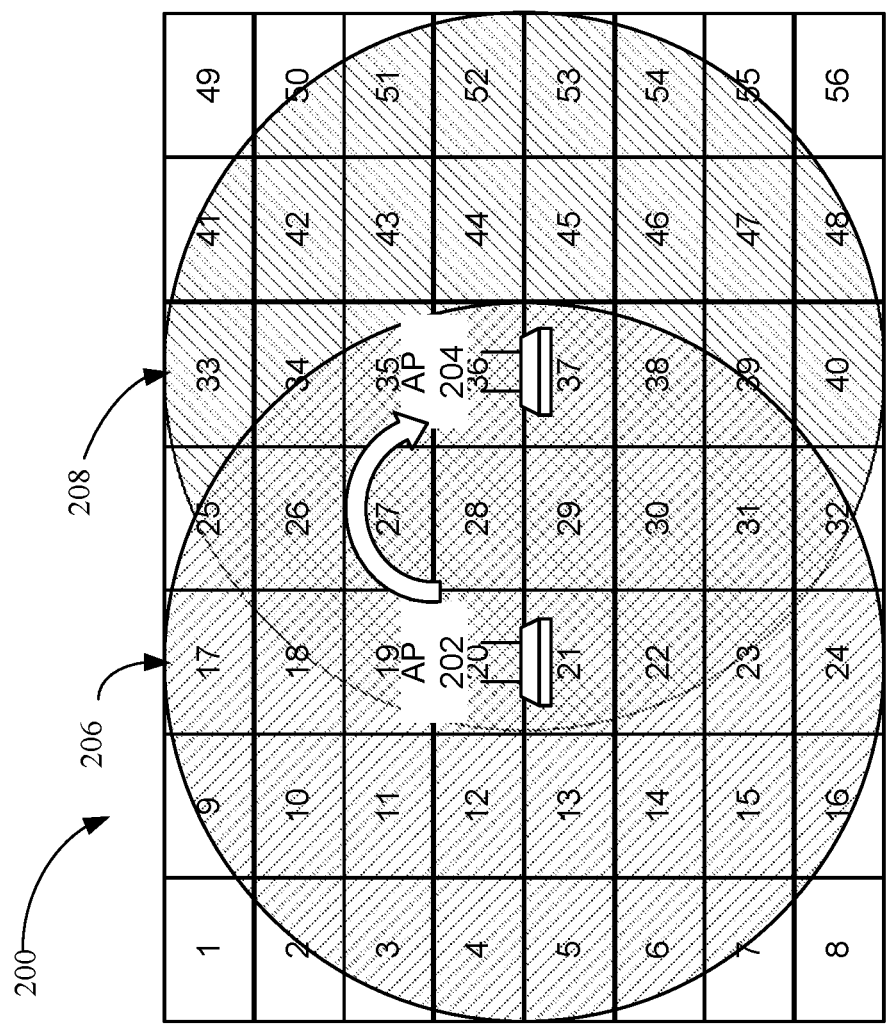
FIG. 2F shows an example of the first AP communicating the consolidated identifiers to the second AP.

FIG. 2F shows an example of the first AP 202 communicating the consolidated (or the unique or final) identifiers to the second AP 204. For example, the first AP 202 may communicate location data for each region 1-56, together with the unique identifier thereof, to the second AP 204. Such may enable each of the first AP 202 and the second AP 204 to uniquely identify each region of each segmented coverage area 206 and 208 (including any overlapping regions). These techniques to identify each region uniquely may be extended to environments having any number of APs.

Figure 3A:
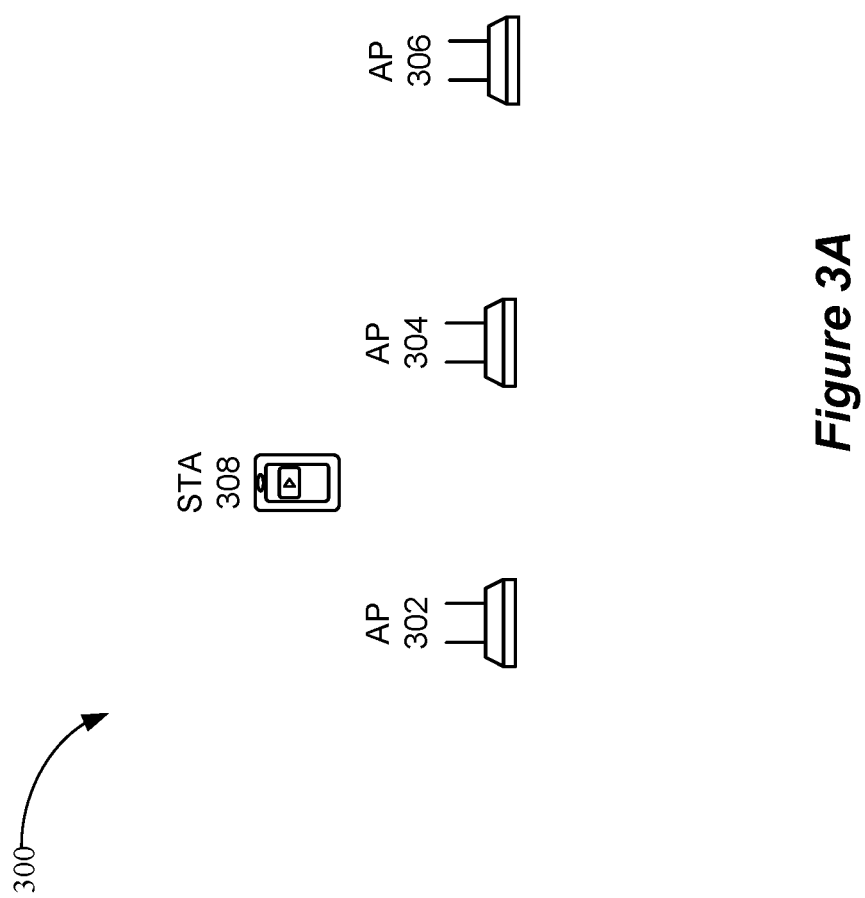
FIG. 3A shows an example multi-AP wireless network environment having a first AP, a second AP, a third AP, and a wireless station (STA).

FIG. 3A shows an example multi-AP wireless network environment 300 having a first AP 302, a second AP 304, a third AP 306, and a wireless station (STA) 308. The first AP 302 may be an example of the root AP 110 or the first AP 202 described respectively with reference to FIG. 1A and FIG. 2A. The second AP 304 and the third AP 306 may each be an example of one of the APs 111-116 described with reference to FIG. 1A or the second AP 204 described with reference to FIG. 2A. The multi-AP wireless network 300 may be a mesh network, such as an EasyMesh network, or another multi-AP network. The station 308 may be an example of one of the stations STA1-STA4 in FIG. 1A.

Figure 3B:
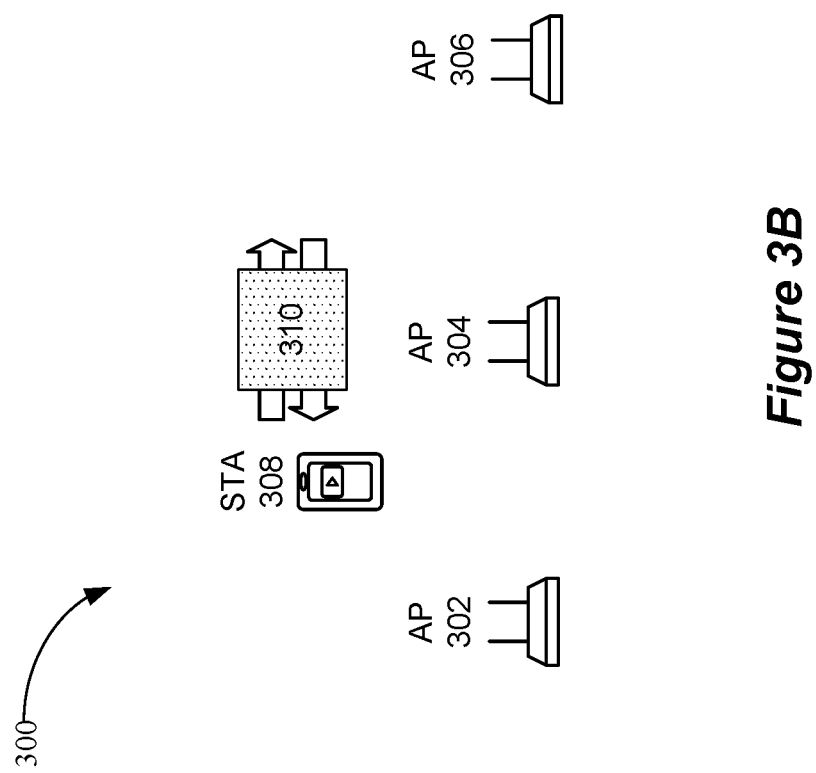
FIG. 3B shows an example of the STA in the multi-AP wireless network environment moving back and forth across a small area.

FIG. 3B shows an example of the STA in the multi-AP wireless network environment 300 moving back and forth across a small area 310. The STA 308 may move back and forth across the small area 310 repeatedly over the course of a time period, such as over the course of a few minutes, an hour, or a day. For example, the environment 300 may be associated with an office setting and the area 310 may lie between the office of a user of the station 308 and a printer used by that user.

Figure 3C:
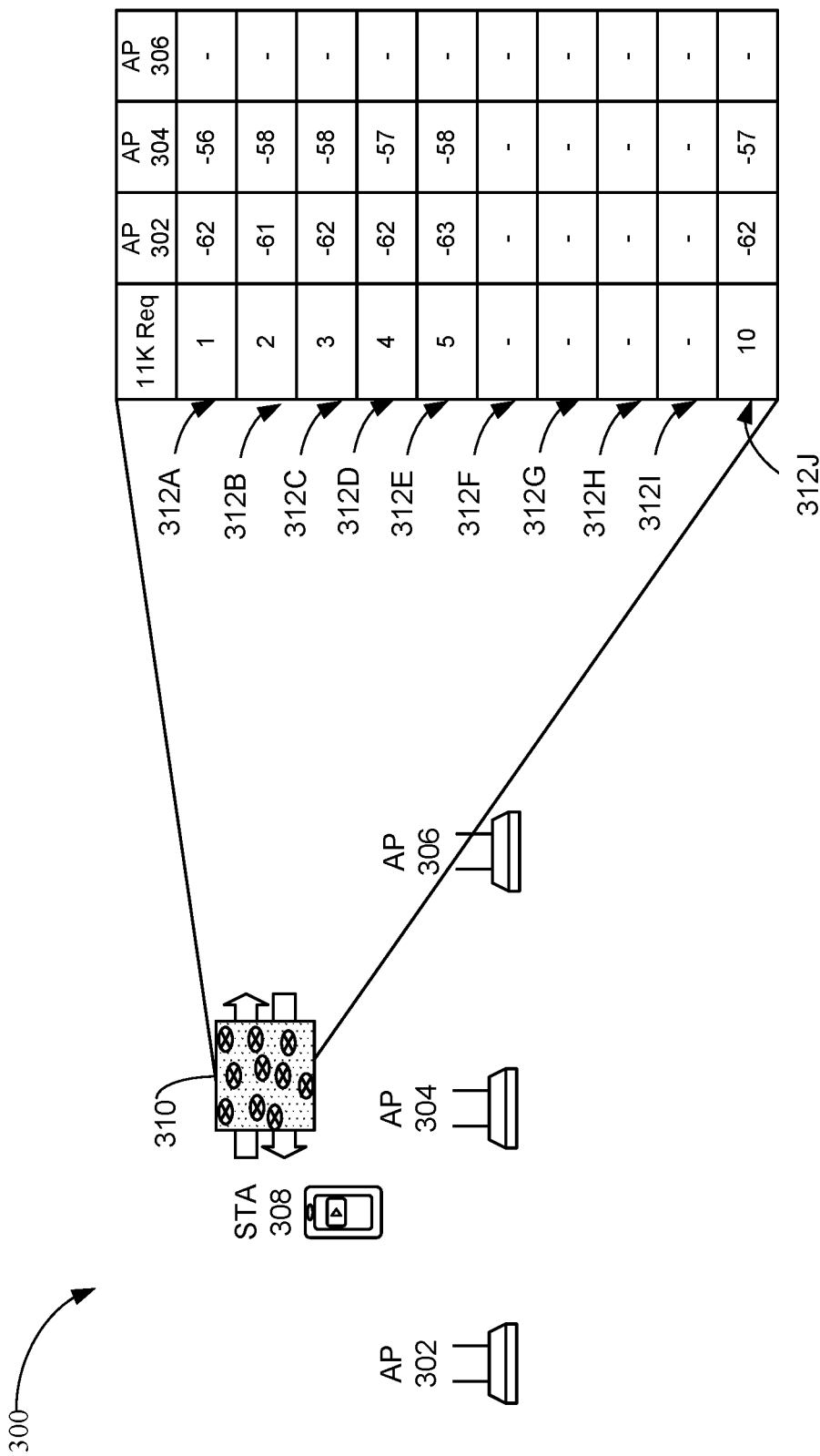
FIG. 3C shows an example of multiple measurement reports being generated for the STA as it moves back and forth across the small area.

FIG. 3C shows an example of multiple measurement reports 312A-312J being generated for the STA 308 as the STA 308 moves back and forth across the small area 310. In this example, the STA 308 may become eligible for steering each time the STA 308 moves across the area 310. For instance, a signal strength of the associated AP (such as AP 302) may equal or go below the steering eligibility threshold as the STA 308 moves across the small area 310, which may cause the associated AP to send the STA 308 a measurement request. The STA 308 may respond with one of the measurement reports 312A-312J. In an aspect, each measurement requests may be an 11k request, and each of the measurement reports 312A-312J may be an 11k report. As described above, each 11k report 312A-312J may include RSSI or like information for the associated AP (AP 302 in this example) and candidate APs 304 and 306.

In the example in FIG. 3C, ten 11k reports 312A-312C are shown to have been generated as the station 308 moves back and forth across the small area 310. Because each 11k report 312A-312J is generated when the STA 308 is located within the small area 310, each 11k report 312A-312J includes generally the same or similar RSSI information for the associated AP 302 and the candidate APs 304 and 306. While FIG. 3C shows a single station 308, the environment 300 may include a large number of stations, and multiple redundant measurement requests and reports may be generated each time any of these stations moves across the small area 310. These redundant measurement requests and reports may flood the medium and therefore affect medium contention and user experience. Further, the resources of the stations (such as STA 308) may be expended needlessly by having to perform multiple active scans of the environment 300 that include redundant information.

Figure 3D:
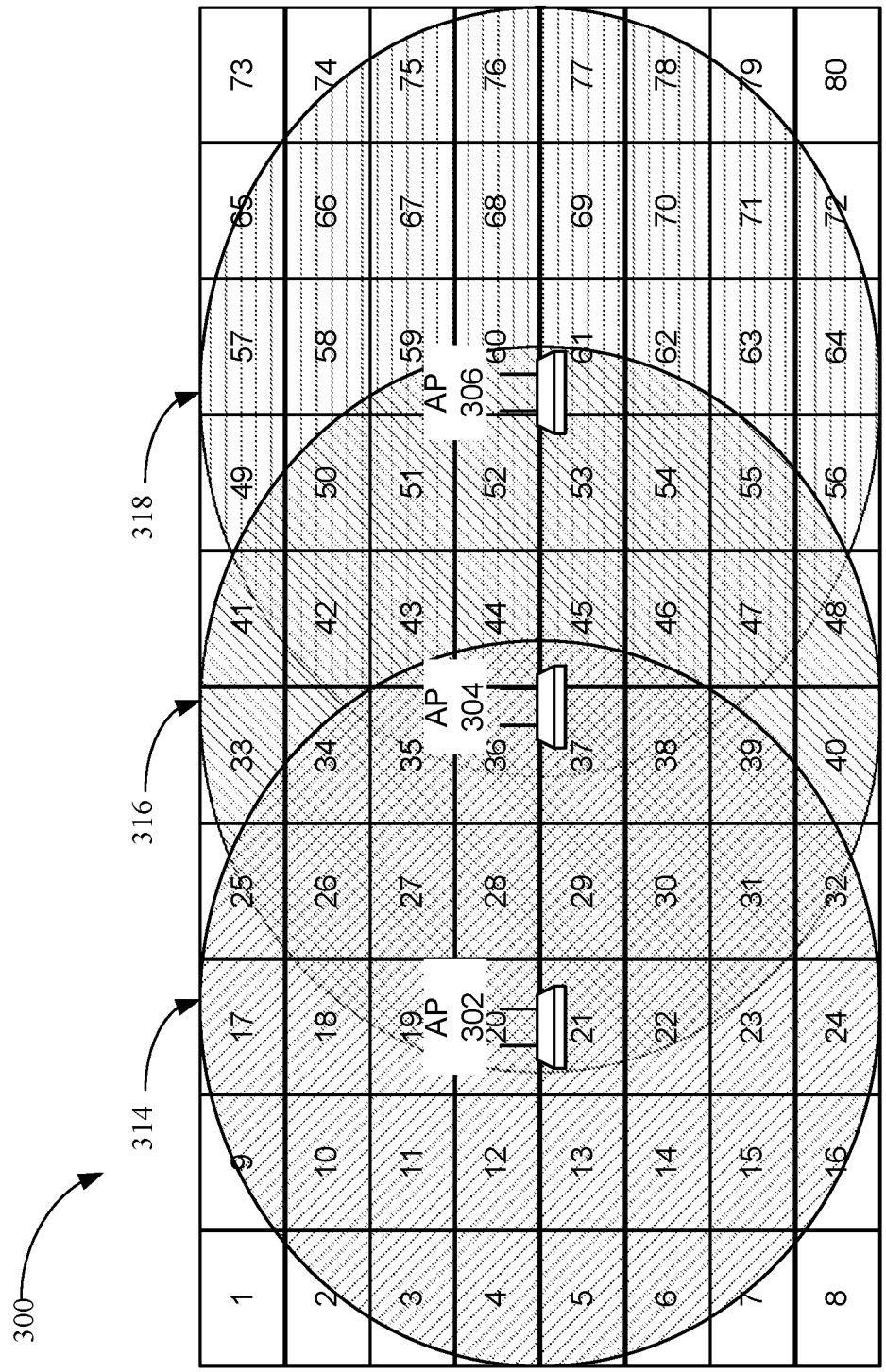
FIG. 3D shows an example of respective coverage areas of the first AP, the second AP, and the third AP after the coverage areas have been segmented into regions and after a unique identifier has been associated with each region.

FIG. 3D shows an example of respective coverage areas 314, 316, and 318 of the first AP 302, the second AP 304, and the third AP 306 after the coverage areas 314, 316, and 318 have been segmented into regions and after a unique identifier 1-80 has been associated with each region. Each of the coverage areas 314, 316, and 318 may have been estimated and segmented by the respective APs 302, 304, and 306 as described above with reference to FIGS. 2A-2C, and one unique identifier 1-80 may have been associated with each region by the first AP 302 (such as a MAP controller associated with the first AP 302) as detailed above with reference to FIGS. 2D-2E. Further, the first AP 302 may have communicated the unique identifier 1-80 of each region to the second AP 304 and the third AP 306, as described above with reference to FIG. 2F.

Figure 3E:
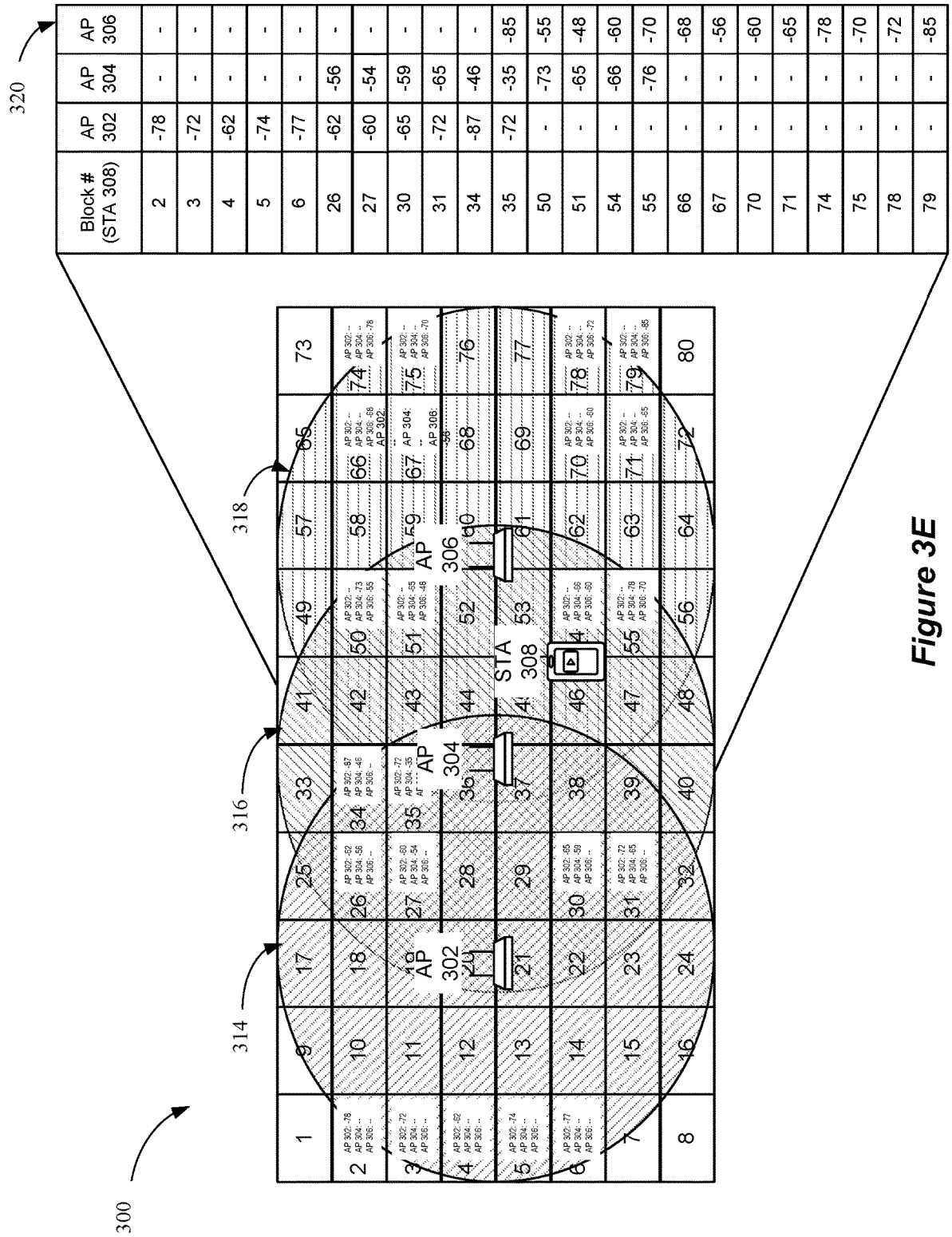
FIG. 3E shows an example of a measurement map that includes measurement reports associated with multiple regions.

FIG. 3E shows an example of a measurement map 320 that includes measurement reports associated with multiple regions. The first AP 302 or the associated AP may monitor the location of the station 308 using any suitable location-monitoring process, for example, using one or more of RTT measurements, measurements taken from a global positioning system (GPS), or other sensor associated with the station 308, Wi-Fi sensing, and the IEEE 802.11mc protocol. When the station 308 is within a particular region 1-80 and initially becomes eligible for steering, such as when the signal strength of the associated AP goes below or equals the steering eligibility threshold, the associated AP may send a measurement request to the station 308 and the station 308 may respond with a measurement report. As described, the measurement report may be an 11k report or another suitable report that indicates a signal strength of the associated AP and candidate APs.

The measurement reports may be stored to allow for subsequent access in the measurement map 320. In some examples, the first AP 302 may store the measurement report locally or elsewhere (such as on the "cloud" or other remote storage). For example, in cases in which the first AP 302 is not the associated AP, the associated AP may communicate the measurement report to the first AP 302 for storage. In some examples, the measurement report may be stored locally on each of the APs 302, 304, and 306, may be stored remotely such that it is accessible to each AP 302, 304, and 306, or both. In this way, as the station 308 moves across the environment 300 and becomes eligible for steering in one or more of the various regions 1-80, the measurement report indicating the signal strength of the associated AP and the candidate APs for the STA 308 in the one or more of the various regions 1-80 may be stored. A measurement report for one or more regions of a segmented coverage area that may be accessed in the making of subsequent steering decisions for an STA may also be referred to herein as a "target AP report" or "target AP information." The target AP information associated with one or more regions may provide the signal strengths of the multiple APs in the one or more regions for an STA, and consequently, may identify the AP with the best signal strength characteristics in a given region for a given STA. In some implementations, the measurement map 320 may be a collection of target AP information for multiple regions. The measurement map 320 may also be interchangeably referred to herein as the signal strength map 320.

In some examples, the measurement map 320 may include the measurement reports associated with multiple regions (such as at least some of the regions 1-80) that have been generated over the course of time as the STA 308 becomes eligible for steering in those regions. The measurement report 320 may thus include, for each of a number of regions, the signal strength characteristics of each of the associated AP and the candidate APs. The measurement map 320 may be used by an AP (such as the first AP 302 or the associated AP) to make steering decisions for the STA 308. The measurement map 320 may include target AP information for fewer than all regions 1-80.

Figure 3F:
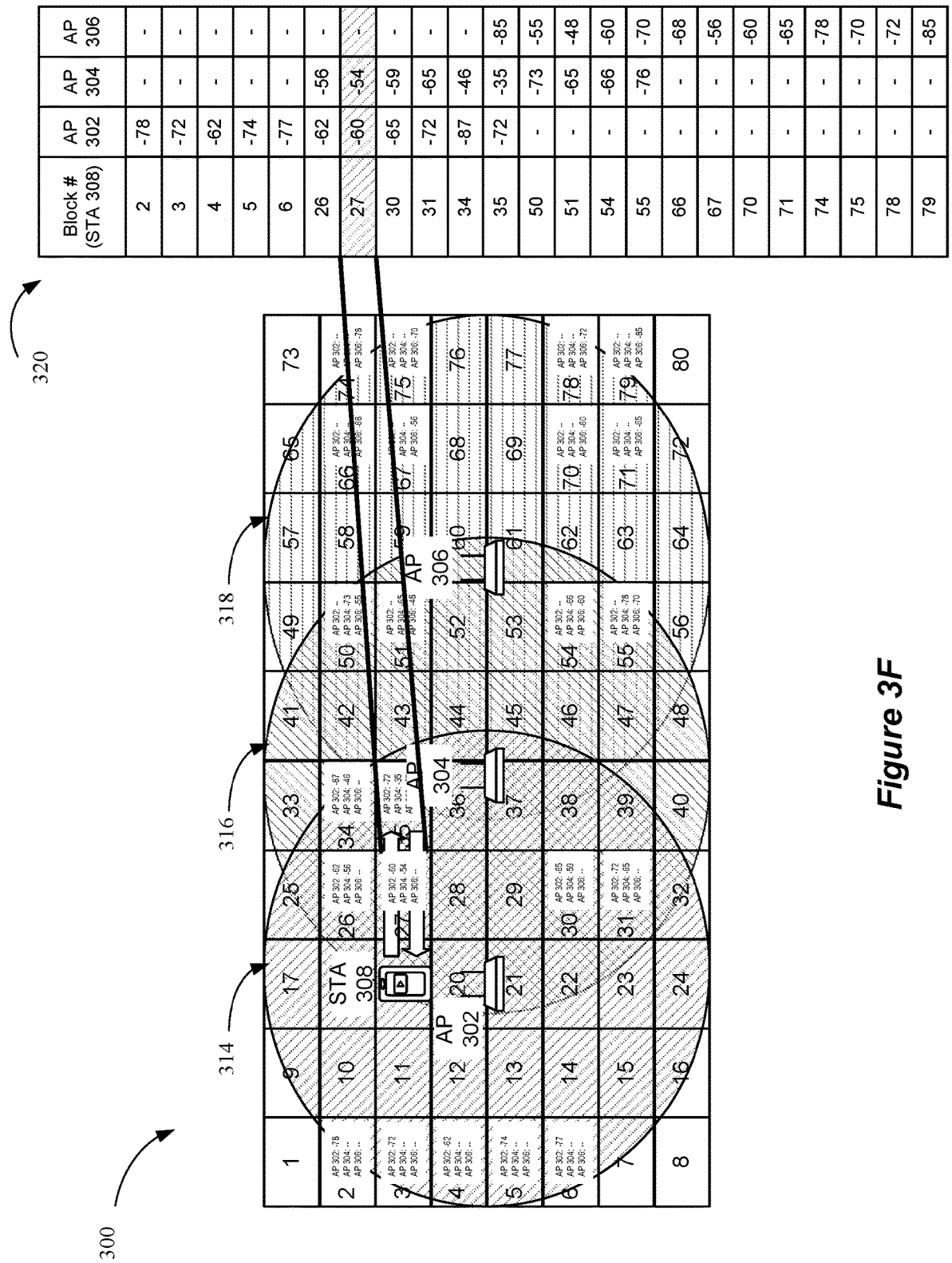
FIG. 3F shows an example of a steering decision for the STA being made in accordance with the measurement map.

FIG. 3F shows an example of a steering decision for the STA 308 being made in accordance with the measurement map 320. Assume, for example, that the area 310 (FIG. 3C) corresponds to region 27 shown in FIG. 3F. The first time the station 308 becomes eligible for steering in the region 27, the associated AP (such as the first AP 302) may transmit to the station 308 a measurement request and the station 308 may respond with a measurement report that includes the signal strength of the associated AP 302 and other APs 304 and 306. In this example, the AP 304 may be the target AP, that is, the AP to which the station 308 is to be steered because the signal strength of the AP 304 in region 27 exceeds the signal strength of the AP 302 in region 27. Thus, when the station 308 is in region 27 and initially becomes eligible for steering, a measurement report may be generated by the STA 308 and the associated AP 302 may steer the station 308 to the target AP 304 in view of the measurement report. The signal strengths of the APs 302, 304, and 306 in region 27, as provided in the measurement report, may also be stored in the map 320. The next time the station 308 is associated with the first AP 302 and becomes eligible for steering in region 27, the first AP 302 may steer the station 308 to the target AP 304 in accordance with the signal strength (or target AP) information of segment 27 in the map 320. The first AP 302 may make this steering decision without the generation of an additional measurement request and report, which report would have shown the same or similar data as already provided in the map 320. As such, the sending of multiple redundant measurement requests and reports in connection with steering the station 308 in region 27 may be avoided, thus freeing up the medium and potentially allowing for faster handoff Reduction of these redundant reports and associated requests can also increase the power efficiency of the STA 308. The user experience, therefore, may be improved.

In the same manner, when the STA 308 is eligible for steering in another region (such as region 2), the first AP 302 (or in SONs, the associated AP) may check whether the map 320 includes signal strength data for that region. If the map 320 includes signal strength data for that region (such as region 2), the steering decision may be made in accordance with the map 320 without having to generate another measurement request and report. Alternately, if the map 320 does not include signal strength data for that region (such as region 2), a measurement request may be sent to the STA 308 and the responsive report or portions thereof may be stored in the map 320 so that subsequent steering decisions of the STA 308 in that region may be made in accordance with the map 320 without generating additional redundant reports.

In some implementations, the APs 302, 304, and 306 may estimate and segment their respective coverage areas 314, 316, and 318 during an onboarding process so as to allow the generation of the map 320 to commence during or shortly after the onboarding process. In some implementations, the regions 1-80 and the map 320 may be updated to facilitate the making of steering decisions in view of up-to-date data. In some examples, the regions 1-80 and the map 320 may be updated periodically (such as once a day, once a week, or once a month). Alternately or in addition, the regions 1-80 or the map 320 may be updated using a time interval set by the manufacturer of the APs 302, 304, and 306 or by a user. In some implementations, all or part of the map 320 may be generated anew in view of shifting of the APs 302, 304, and 306 from their original position, as such may impact the target AP information associated with one or more regions. In these examples, the first AP 302 may continuously or periodically monitor the location of the APs 302, 304, and 306 to ensure the map 320 includes current data.

FIG. 4A shows an example multi-AP wireless network environment 400 having a first AP 402, a second AP 404, a third AP 406, and an STA 408. The first AP 402, the second AP 404, and the third AP 406 may respectively be an example of the first AP 302, the second AP 304, and the third AP 306 described above with reference to FIG. 3A. The STA 408 may be an example of the STA 308 discussed above with reference to FIG. 3A. The multi-AP wireless network 400 may be a mesh network, such as an EasyMesh network, or another multi-AP network.

Figure 4B:
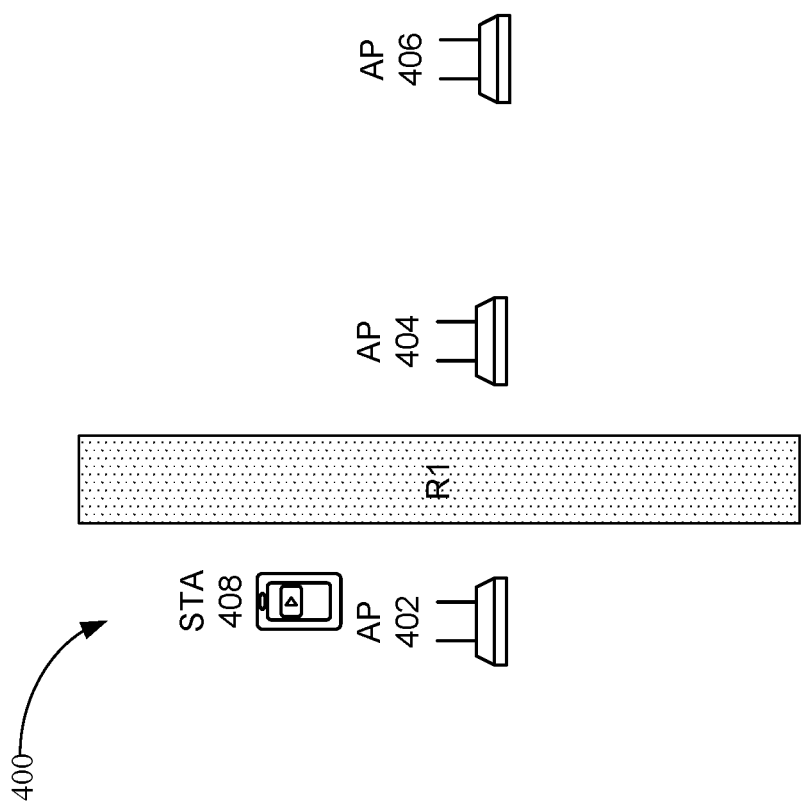
FIG. 4B shows an example of an area within the multi-AP wireless network environment where an STA in the environment is eligible for steering.

FIG. 4B shows an example of an area R1 within the multi-AP wireless network environment 400 where the STA 408 is eligible for steering. For example, when the station 408 is within the area R1, its signal strength may be less than or equal to the steering eligibility threshold.

Figure 4C:
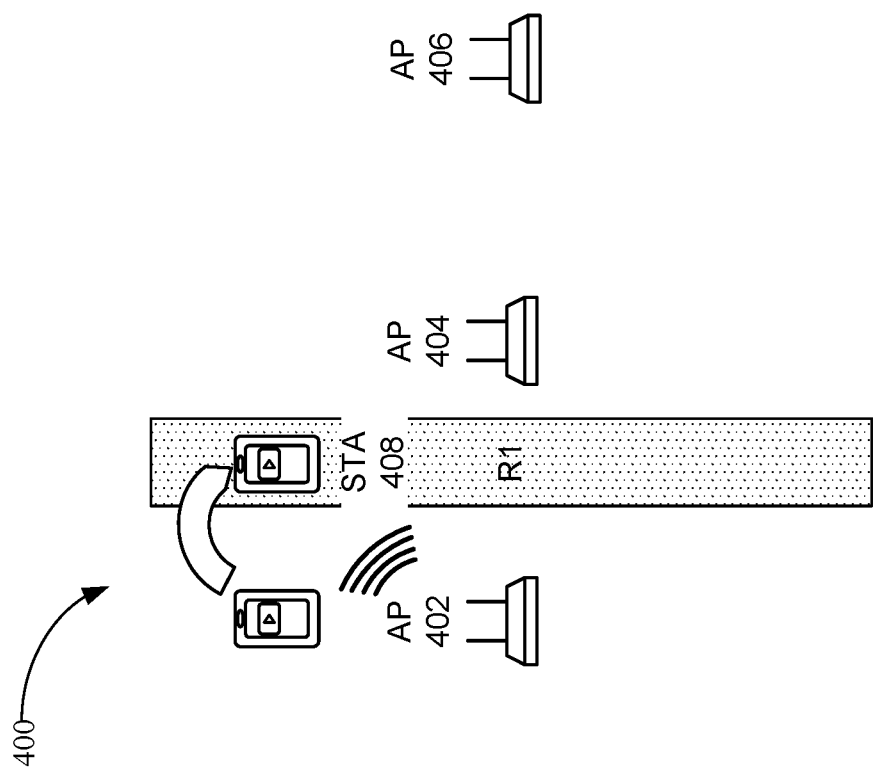
FIG. 4C shows an example of the STA within the area.

FIG. 4C shows an example of the STA 408 within the area R1. In this example, the station 408 is associated with AP 402. As described, when the STA 408 is within the area R1 and is eligible for steering in conventional schemes, the associated AP 402 may send a measurement request (such as an 11k request) and the STA 408 may respond with a measurement report that includes the signal strength of the associated AP 402 and candidate APs 404 and 406.

Figure 4D:
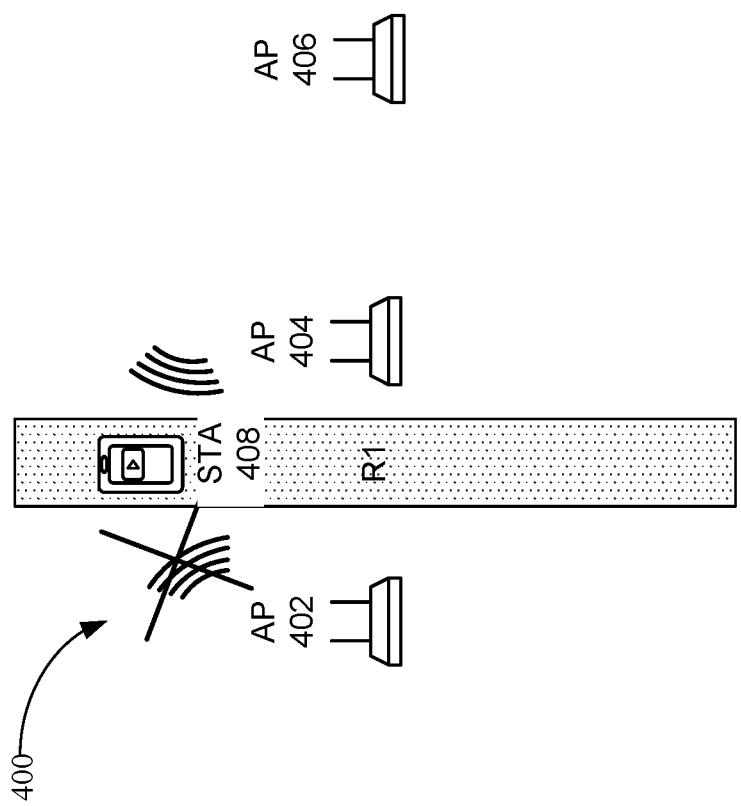
FIG. 4D shows an example of the STA in the area being steered from the first AP to the second AP.

FIG. 4D shows an example of the STA 408 in the area R1 being steered from the first AP (that is, the associated AP) 402 to the second AP 404. For instance, the STA 408 may be steered by the associated AP 402 to the candidate AP 404 because the signal strength of the candidate AP 404 is greater than the signal strength of the associated AP 402. In the example of FIG. 4D, the station 408 may be steered from the associated AP 402 to the second AP 404 even though the difference between the signal strengths of the two APs when the station 408 is in the area R1 is small. Such may lead to undesirable results, particularly where the difference in the signal strengths of the associated AP and the candidate AP is small enough so as to not distinctly impact the service to the STA 408 in practice. In conventional schemes, the STA 408 in the area R1 may be steered from the first AP 402 to the second AP 404 multiple times over the course of a time period even in cases in which the signal strength of the second AP 404 is only marginally better than the signal strength of the first AP 402. Similarly, the STA 408 in the area R1 may repeatedly be steered from the second AP 404 to the first AP 402 even in cases in which the signal strength of the first AP 402 is marginally greater than the signal strength of the second AP. Such repeated steering of the STA 408 in the area R1 from the first AP 402 to the second AP 404 and back from the second AP 404 to the first AP 402 may waste resources of the STA 408 and adversely affect user experience in cases where the marginal difference in signal strengths of the associated and candidate APs is too small to improve the service to the STA 408.

In some aspects, the associated AP 402 (such as the MAP controller) may steer the STA 408 from its associated AP to the candidate AP in cases in which the signal strength of the candidate AP exceeds the signal strength of the associated AP and a difference between the signal strength of the candidate AP and the associated AP is equal to or exceeds a threshold (also referred to as a "steering threshold"). Use of the steering threshold may allow the STA 408 to continue to be associated with the associated AP in cases in which a signal strength of a candidate AP is marginally better than the associated AP. The steering threshold may be set by the manufacturer of the APs 402, 404, and 406. In some examples, the steering threshold may be user-configurable. In some examples, the steering threshold may be adaptively modified (such as by the MAP controller associated with the first AP 402) in view of an evaluation of performance characteristics of the STA 408.

Figure 4E:
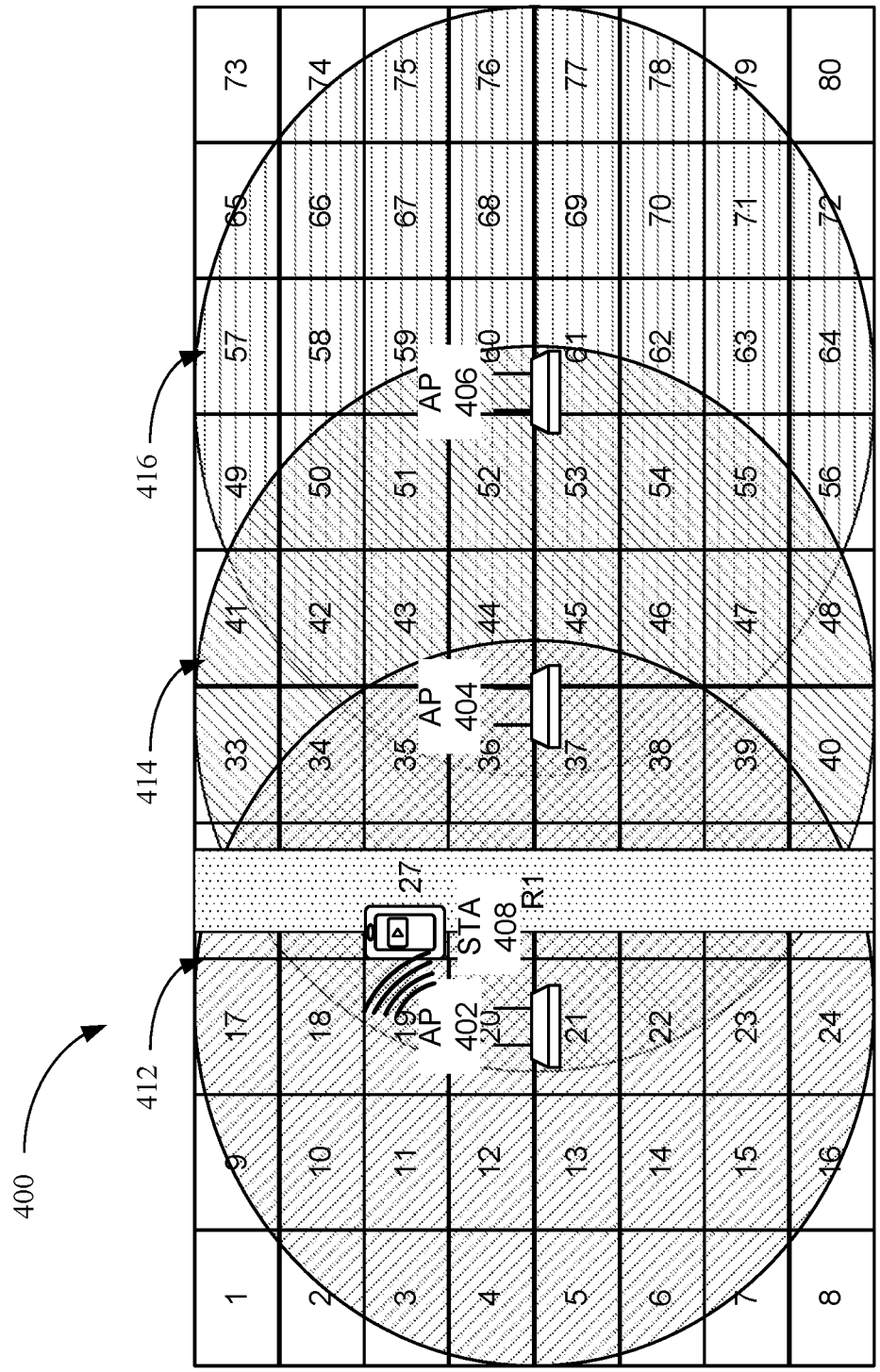
FIG. 4E shows an example of the respective coverage areas of the first AP, the second AP, and the third AP after the coverage areas have been segmented into regions and after a unique identifier has been associated with each region.

FIG. 4E shows an example of the respective coverage areas 412, 414, and 416 of the first AP 402, the second AP 404, and the third AP 406 after the coverage areas 412, 414, and 416 have been segmented into regions 1-80 and after a unique identifier has been associated with each region, as described above with reference to FIG. 3D. The station 408 is shown to be in region 27 in the area R1, is currently associated with AP 402, and may be eligible for steering.

Figure 4F:
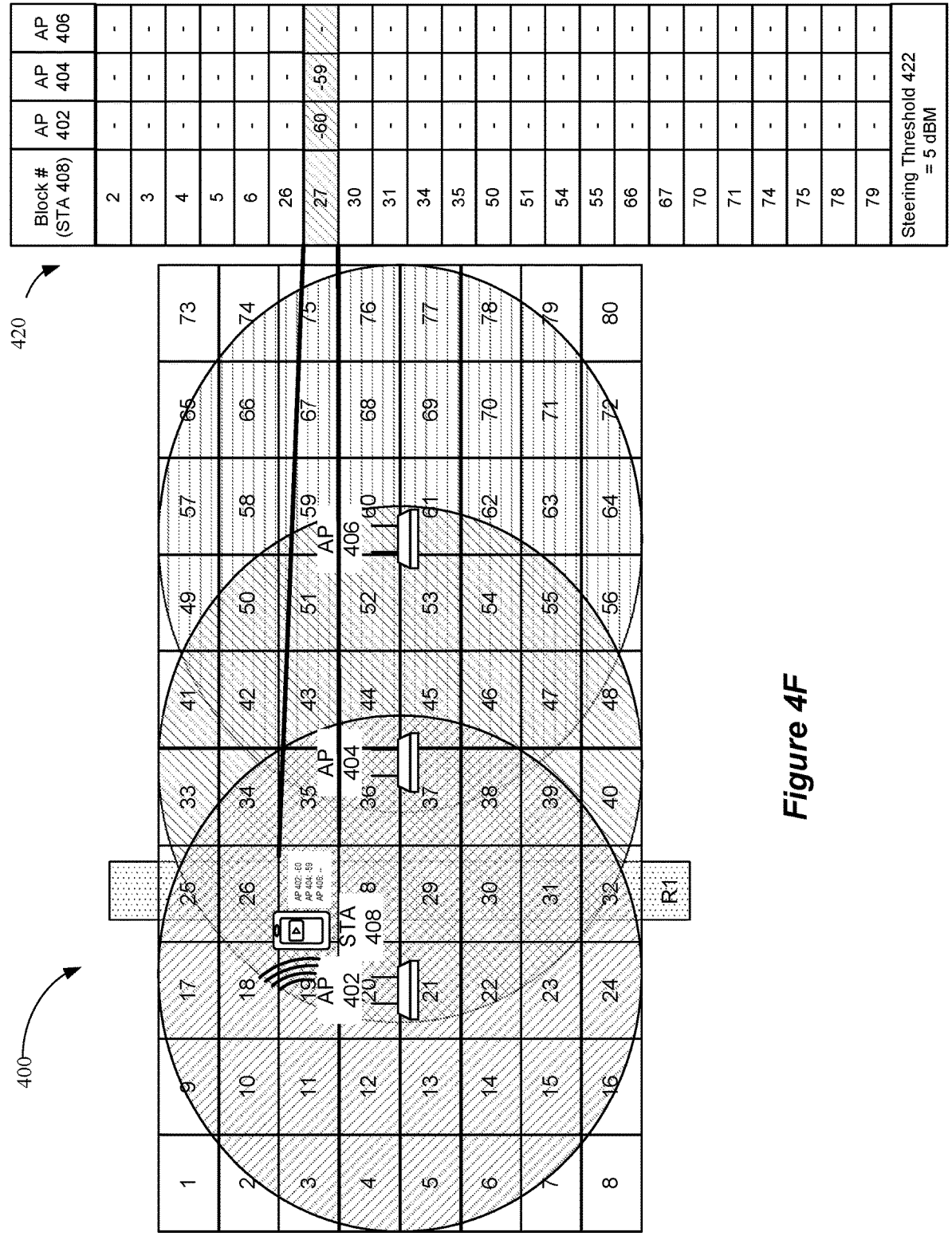
FIG. 4F shows an example of a measurement map that includes a measurement report associated with a region within which the STA is located.

FIG. 4F shows an example of a measurement map 420 that includes a measurement report associated with the region 27 within which the STA 408 is located. The region 27 is within the area R1 and the STA 408 is currently associated with AP 402. The report provided in the map 420 may have been generated when the STA 408 was initially eligible for steering in region 27. The map 420 shows that while the second AP 404 has better signal strength characteristics in region 27 relative to the associated AP 402, the difference between the signal strengths of the associated AP 402 and the candidate AP 404 is minimal (1 dBm in this example). In the example shown in FIG. 4F, a steering threshold 422 is set to 5 dBm. The steering threshold 422 may be stored as part of the map 420 or may be provided elsewhere.

Figure 4G:
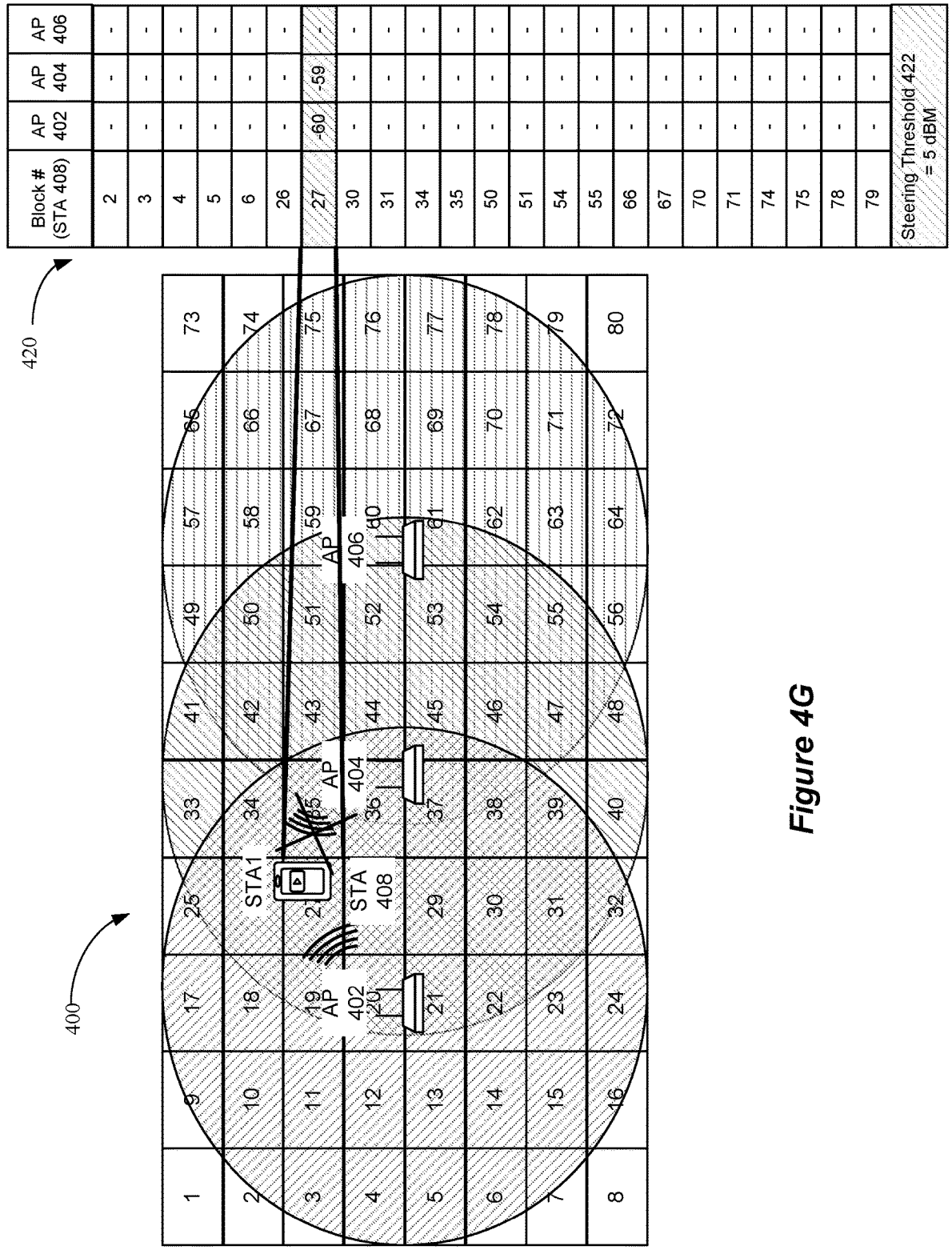
FIG. 4G shows an example of a steering decision being made in accordance the measurement map and a steering threshold.

FIG. 4G shows an example of a steering decision being made in accordance the measurement map 420 and the steering threshold 422. Specifically, even though the signal strength of the candidate AP 404 is better than the signal strength of the associated AP 402, the STA 408 is not steered to the candidate AP 402 because the difference in the signal strengths of the associated AP 402 and the candidate AP 404 does not exceed the steering threshold 422. Alternately, in cases in which the difference between the signal strengths of the associated AP 402 and the candidate AP 404 is greater than or equal to the steering threshold 422, the STA 408 may be steered to the candidate AP 404. Use of the steering threshold 422 may potentially limit steering of the STA 408 to cases in which the STA 408 is more likely to see an improvement in service from the steering.

Figure 5A:
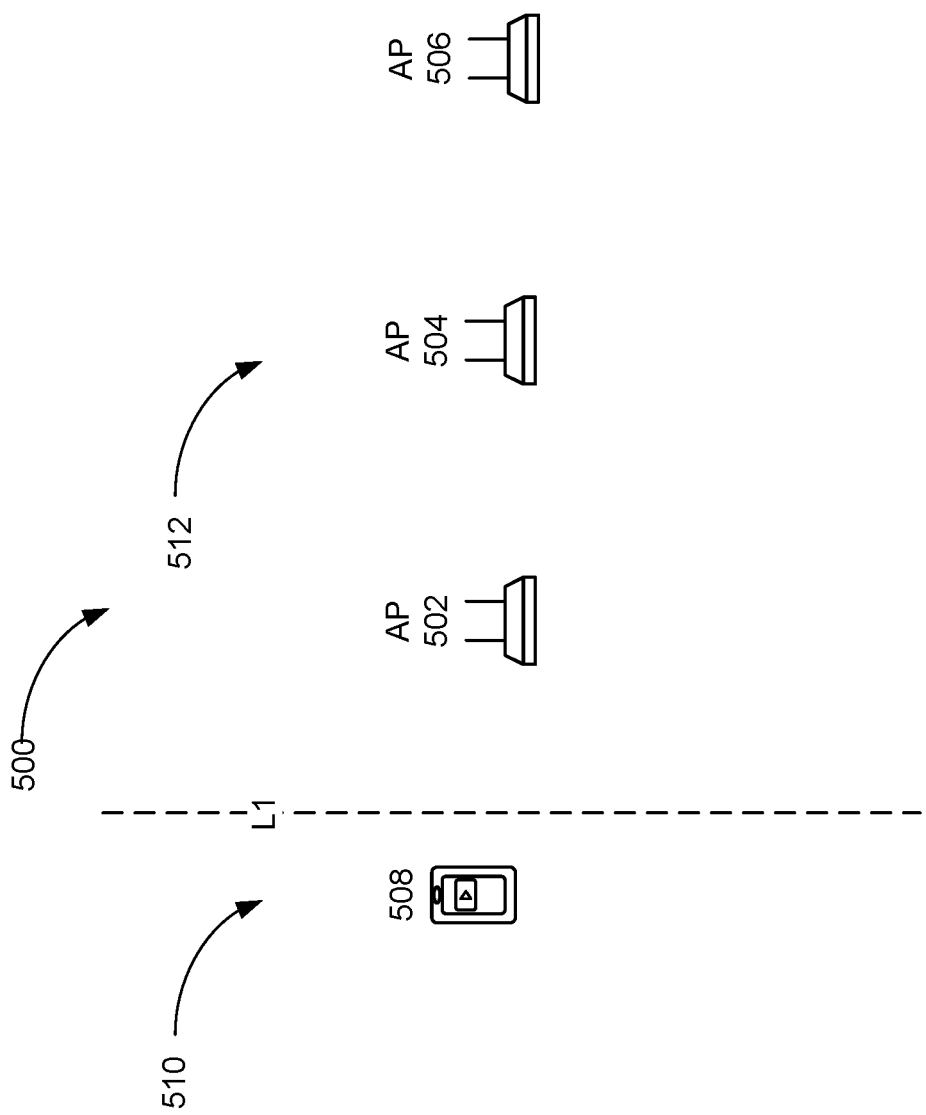
FIG. 5A shows an example multi-AP wireless network environment having a first AP, a second AP, a third AP, and an STA.

FIG. 5A shows an example multi-AP wireless network environment 500 having a first AP 502, a second AP 504, a third AP 506, and an STA 508. The first AP 502, the second AP 504, and the third AP 506 may respectively be an example of the first AP 302, the second AP 304, and the third AP 306 described above with reference to FIG. 3A. The STA 508 may be an example of the STA 308 discussed above with reference to FIG. 3A. The multi-AP wireless network 500 may be a mesh network, such as an EasyMesh network, or another multi-AP network. In FIG. 5A, an imaginary boundary line L1, shown for illustrative purposes, separates the environment 500 into areas 510 and 512. In the example in FIGS. 5A-5D, the area 510 is served, if at all, by a single AP (AP 502 in this example). The other APs (that is, AP 504 are AP 506) may not serve and may not be seen by the STA 508 in the area 510.

Figure 5B:
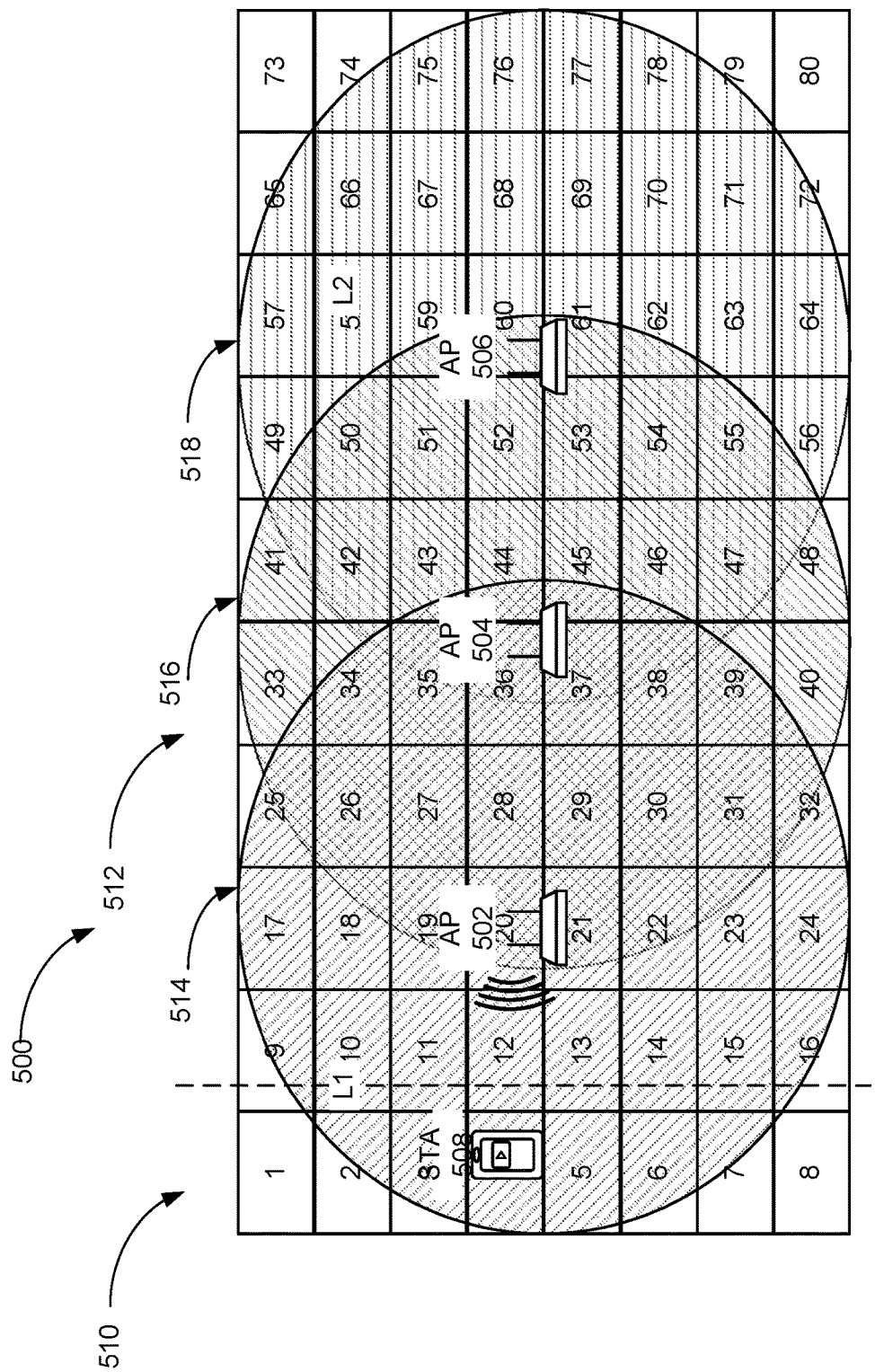
FIG. 5B shows an example of the respective coverage areas of the first AP, the second AP, and the third AP after the coverage areas have been segmented into regions and after a unique identifier has been associated with each region.

FIG. 5B shows an example of the respective coverage areas 514, 516, and 518 of the first AP 502, the second AP 504, and the third AP 506 after the coverage areas 514, 516, and 518 have been segmented into regions 1-80 and after a unique identifier has been associated with each region. Each coverage area 514, 516, and 518 may have been estimated and segmented by the respective APs 502, 504, and 506 as described above with reference to FIGS. 2A-2C, and one unique identifier 1-80 may have been associated with each region by the first AP 502 as detailed above with reference to FIGS. 2D-2E. Further, the first AP 502 may have communicated the unique identifier 1-80 of each region to the second AP 504 and the third AP 506, as described above with reference to FIG. 2F.

Figure 5C:
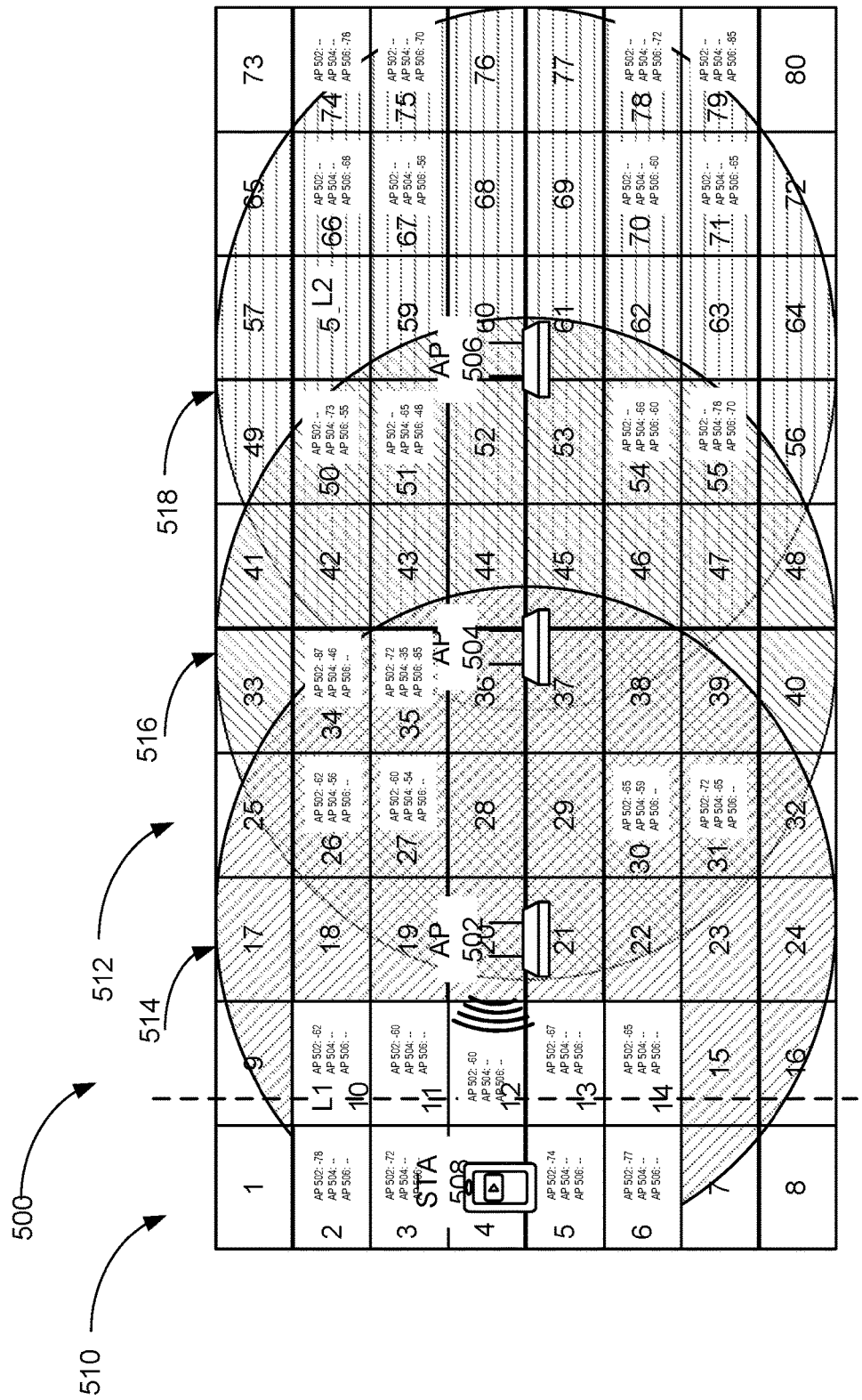
FIG. 5C shows an example of measurement reports associated with some regions of the segmented coverage areas.

FIG. 5C shows an example of measurement reports associated with some of the regions 1-80 of the segmented coverage areas 514, 516, and 518. As described above, the measurement report associated with a particular region may have been generated when the STA 508 initially became eligible for steering in that region. The measurement reports associated with the various regions 1-80 may be stored, such as in a map as discussed above for map 420 with reference to FIG. 4F.

The STA 508 in the example of FIG. 5C is located in region 4 and is eligible for steering. In the example of FIG. 5C, target AP information for region 4 is not currently known because the station 508 may not have previously been eligible for steering in region 4. However, measurement reports are associated with regions that neighbor region 4, which may have been generated and stored when the station 508 was previously eligible for steering in these neighboring regions. Specifically, in the example of FIG. 5C, target AP information (that is, a measurement report or signal strength data) is associated with each of regions 2, 3, 5, 6, 10, 11, 12, 13, and 14 neighboring region 4. The target AP information of the neighboring regions 2, 3, 5, 6, 10, 11, 12, 13, and 14 indicates that the first AP 502 serves these regions alone. The first AP 502 may, in view of the signal strength data of the regions neighboring region 4, ascertain, determine, or establish that region 4 is also unlikely to be served by either of the second AP 504 and the third AP 506. Thus, the associated AP 502 may forego the sending of a measurement request when the STA 508 is eligible for steering in region 4 even in cases where signal strength data for region 4 has not previously been collected. The generation of a measurement report that does not yield actionable data may therefore be avoided.

Figure 5D:
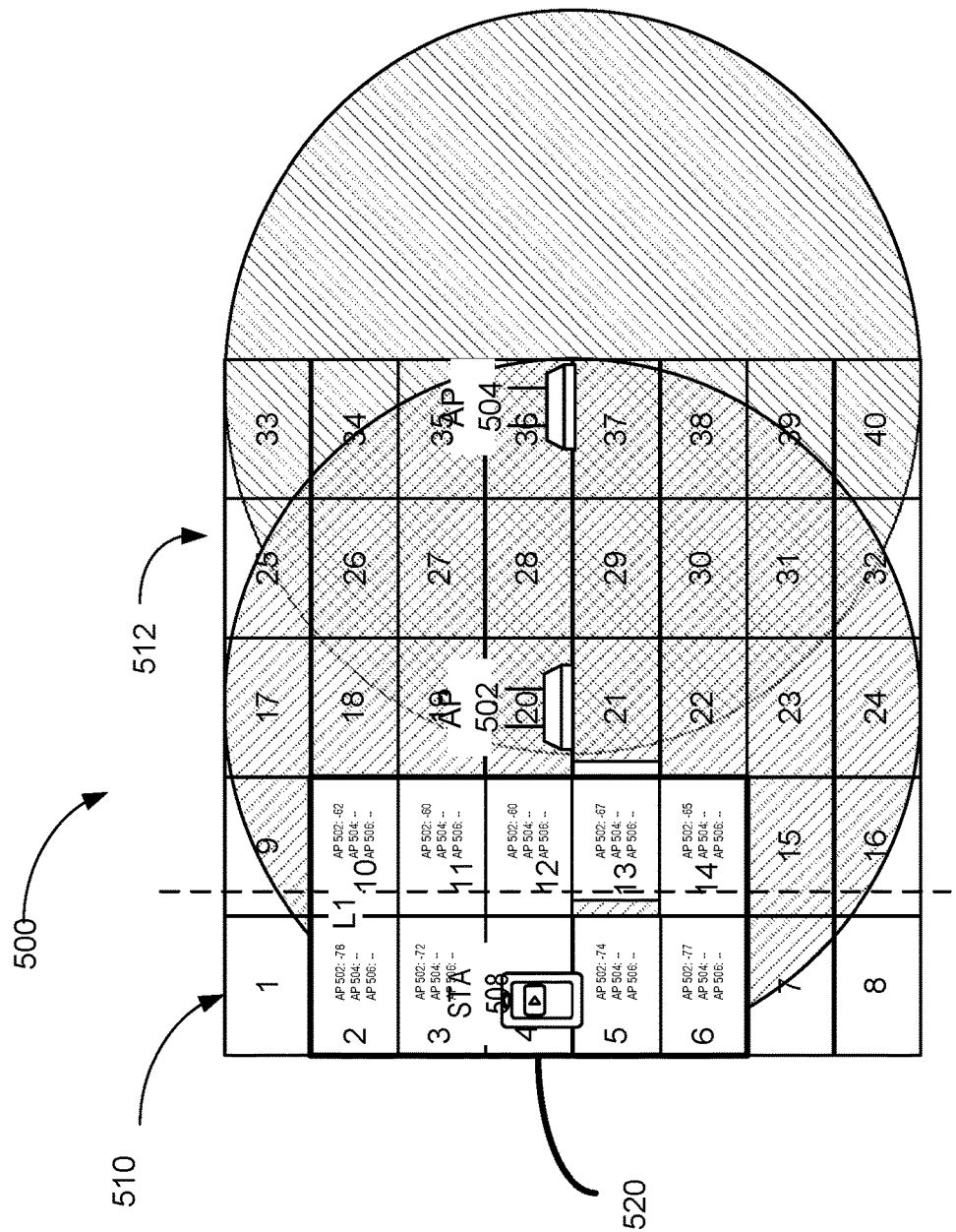
FIG. 5D shows an example of a region being grouped together with neighboring regions because of the similar signal strength characteristics associated with each of the neighboring regions.

FIG. 5D shows an example of the region 4 being grouped together with neighboring regions 2, 3, 5, 6, 10, 11, 12, 13, and 14 because of the similar signal strength characteristics associated with each of these neighboring regions. Specifically, in this example, the first AP 502, such as the MAP controller thereof, may group each of regions 2, 3, 5, 6, 10, 11, 12, 13, and 14, together with region 4, in a group 520, as region 4 is also unlikely to be served by any of APs 504 and 506 (or is likely to be served only by AP 502). In some examples, a region may be grouped together with neighboring regions in this fashion if a particular number of neighboring regions have the same or comparable signal strength characteristics. For instance, a region may be grouped together with three regions above the region in question in cases in which each of the three regions are served by no more than one AP. Or, for instance, a region may be grouped together with two regions on each side of the region in question in cases in which the same AP has the best signal strength characteristics in these neighboring regions. In the example of FIG. 5D, no measurement requests may be sent when the STA 508 is eligible for steering in any of the regions within the group 520. In some examples, a group (such as the group 520) may include two or more regions whose signal strength is estimated using the signal strength data of neighboring regions.

Figure 6A:
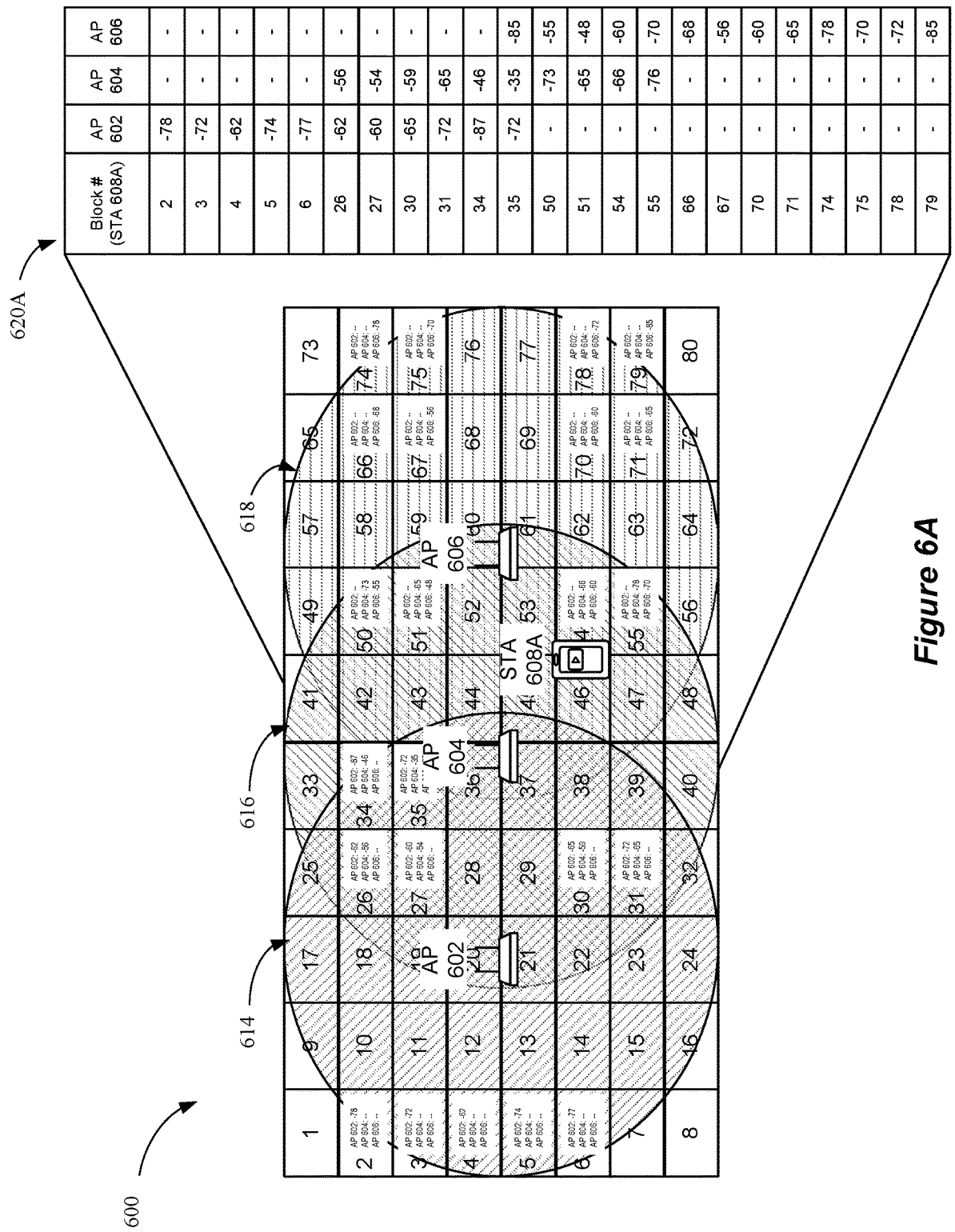
FIG. 6A shows an example of a measurement map associated with a first STA in a multi-AP wireless network environment having a first AP, a second AP, and a third AP.

FIG. 6A shows an example of a measurement map 620A associated with a first STA 608A in an example multi-AP wireless network environment 600 having a first AP 602, a second AP 604, and a third AP 606. Specifically, FIG. 6A shows the respective coverage areas 614, 616, and 618 associated with the first AP 602, the second AP 604, and the third AP 606 after the coverage areas 614, 616, and 618 have been segmented into regions 1-80 and after a unique identifier has been associated with each region. The measurement map 620A includes target AP information for several regions.

In some implementations, a measurement map associated with a first STA may be assigned to a second STA in cases in which the first STA and the second STA are comparable. For instance, in examples in which a complete or partial measurement map has been associated with the first STA, the complete or partial measurement map may be associated with the second STA that subsequently joins the network in view of a comparability or similarity of the first STA and the second STA. Assignment of the measurement map associated with the first STA to the second STA may reduce or eliminate the measurement requests and reports that would otherwise have needed to be generated to populate the measurement map of the second STA anew.

Figure 6B:
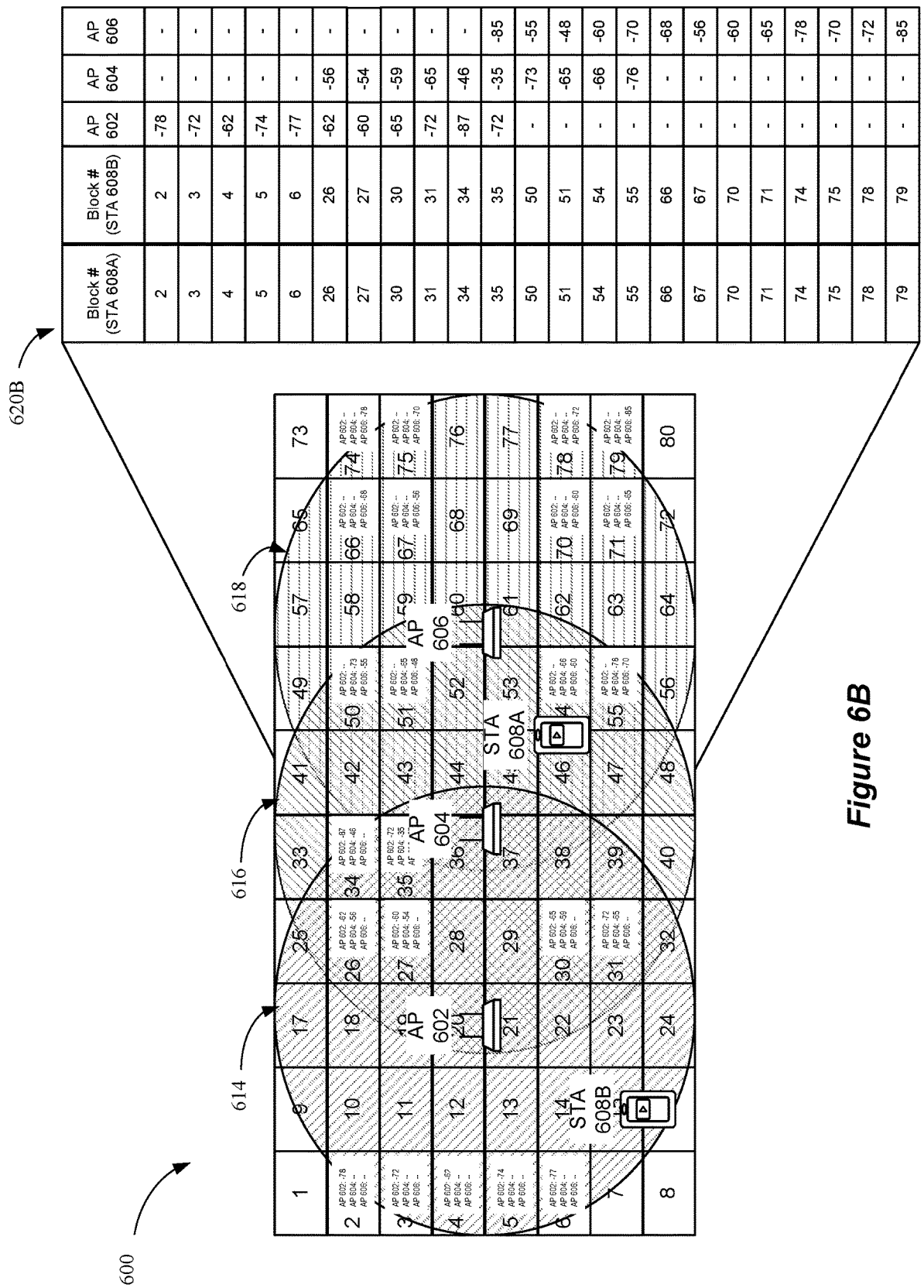
FIG. 6B shows an example of the first AP associating measurement values in a measurement map of a first STA with a second STA in view of comparability of the first STA and the second STA are comparable.

FIG. 6B shows an example of the first AP 602 associating measurement values in the signal strength map 620A of the first STA 608A with a second STA 608B in view of comparability of the first STA 620A and the second STA 602B. Specifically, FIG. 6B shows a measurement map 620B for the second STA 608B that includes the same measurement values per region as the measurement map 620A. In some implementations, the first AP 602, such as a MAP controller associated therewith, may compare the first STA 608A and the second STA 608B when the second STA 608B joins the network environment 600. If the first AP 602 ascertains, determines, or establishes that the first STA 608A and the second STA 608B are comparable, the first AP 602 may assign the measurement values in the map 620A of the first STA 608A to the map 620B of the second STA 608B. For example, the first AP 602 may ascertain, determine, or establish that the first STA 608A and the second STA 608B are comparable if they are of the same model, are iterations of the same model, or have been manufactured by the same manufacturer. In some implementations, the first AP 602A may assign the measurement values of the map 620A to the map 620B in cases in which the measured measurement values of the STA 608B in multiple regions are the same as or comparable to the measured measurement values of the first STA 608A in those regions. These techniques may allow some or all of the measurement reports associated with the STA 608A to be reused for STA 608B without having to generate all new measurement reports for STA 608B.

Figure 7A:
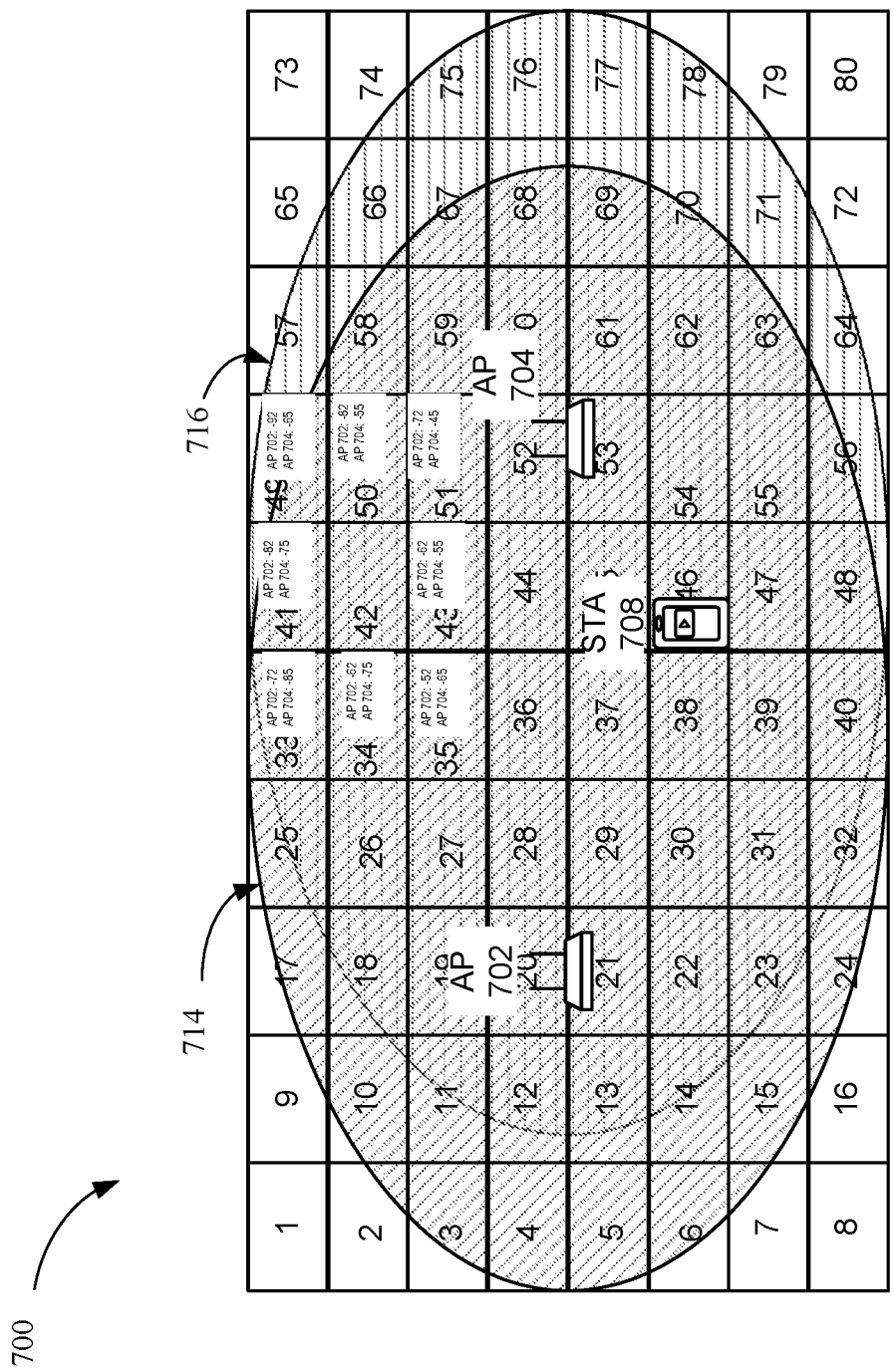
FIG. 7A shows an example of measurement values of certain regions for an STA in a multi-AP wireless network environment having a first AP and a second AP.

FIG. 7A shows an example of measurement values of certain regions for an STA 708 in a multi-AP wireless network environment 700 having a first AP 702 and a second AP 704. A first segmented coverage area 714 may be associated with the first AP 702 and a second segmented coverage area 716 may be associated with the second AP 704. Regions 33, 34, 35, 41, 43, 49, 50, and 51 each have measurement values associated therewith, each of which may respectively have been generated when the STA 708 was first eligible for steering in that region. Region 42 is boxed in between regions 33, 34, 35, 41, 43, 49, 50, and 51, and is shown to not have a measurement value associated therewith. This may be because the STA 708 may not have yet been eligible for steering in region 42.

In some implementations, the first AP 702, such as a MAP controller associated with the first AP 702, may approximate the measurement value of a region using measured measurement values of neighboring regions.

Figure 7B:
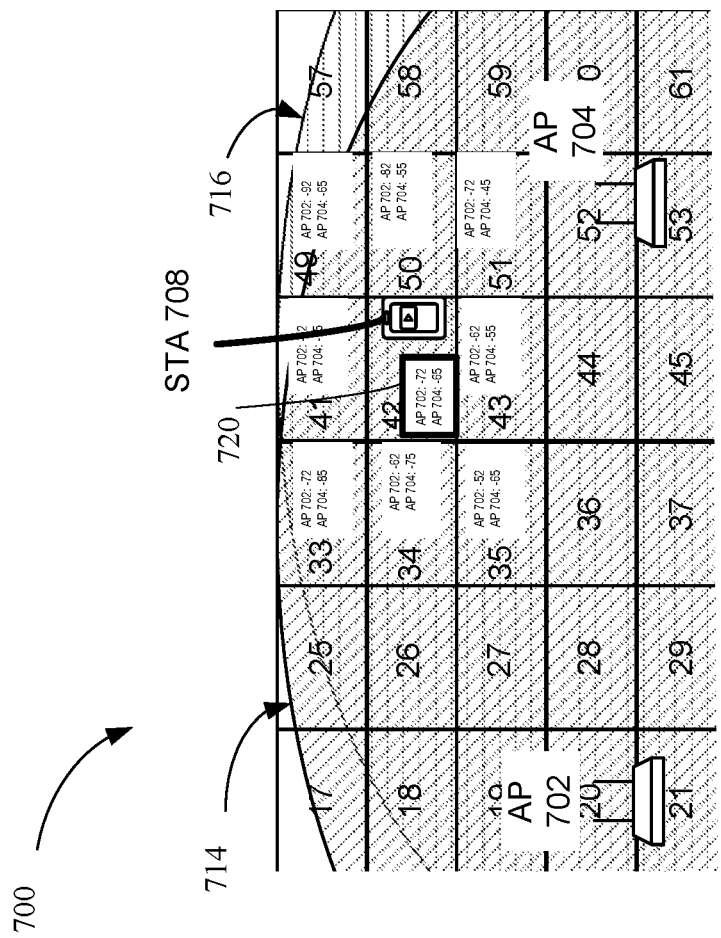
FIG. 7B shows an example of a measurement value of a region being estimated using measurement values of neighboring regions.

FIG. 7B shows an example of a measurement value of region 42 being estimated using measurement values of neighboring regions 33, 34, 35, 41, 43, 49, 50, and 51. Specifically, in FIG. 7B, the STA 708 has moved to region 42, with which no measurement values may previously have been associated.

In the example of FIG. 7A, the first AP 702 is the associated AP. Prior to the first AP 702 sending a measurement request when it is in region 42, the first AP 702 (such as the MAP controller) may ascertain, determine, or establish that some or all of the regions 33, 34, 35, 41, 43, 49, 50, and 51 neighboring region 42 have a measurement value associated therewith. The first AP 702 may use the measurement values of the neighboring regions to estimate the measurement value of region 42. The measurement value of region 42 may therefore be estimated without the need to send a measurement request and report for region 42, which may free up resources and potentially result in faster handoff and improved user experience.

In some implementations, the first AP 702 may estimate the signal strength of AP 702 in region 42 by averaging the signal strength of AP 702 in each of regions 33, 34, 35, 41, 43, 49, 50, and 51 surrounding region 42. The first AP 702 may likewise estimate the signal strength of AP 704 in region 42 by averaging the signal strength of AP 704 in each of regions 33, 34, 35, 41, 43, 49, 50, and 51 surrounding region 42. In this manner, an estimated measurement value 720 for each of AP 702 and AP 704 for STA 708 may be associated with the region 42.

Figure 8A:
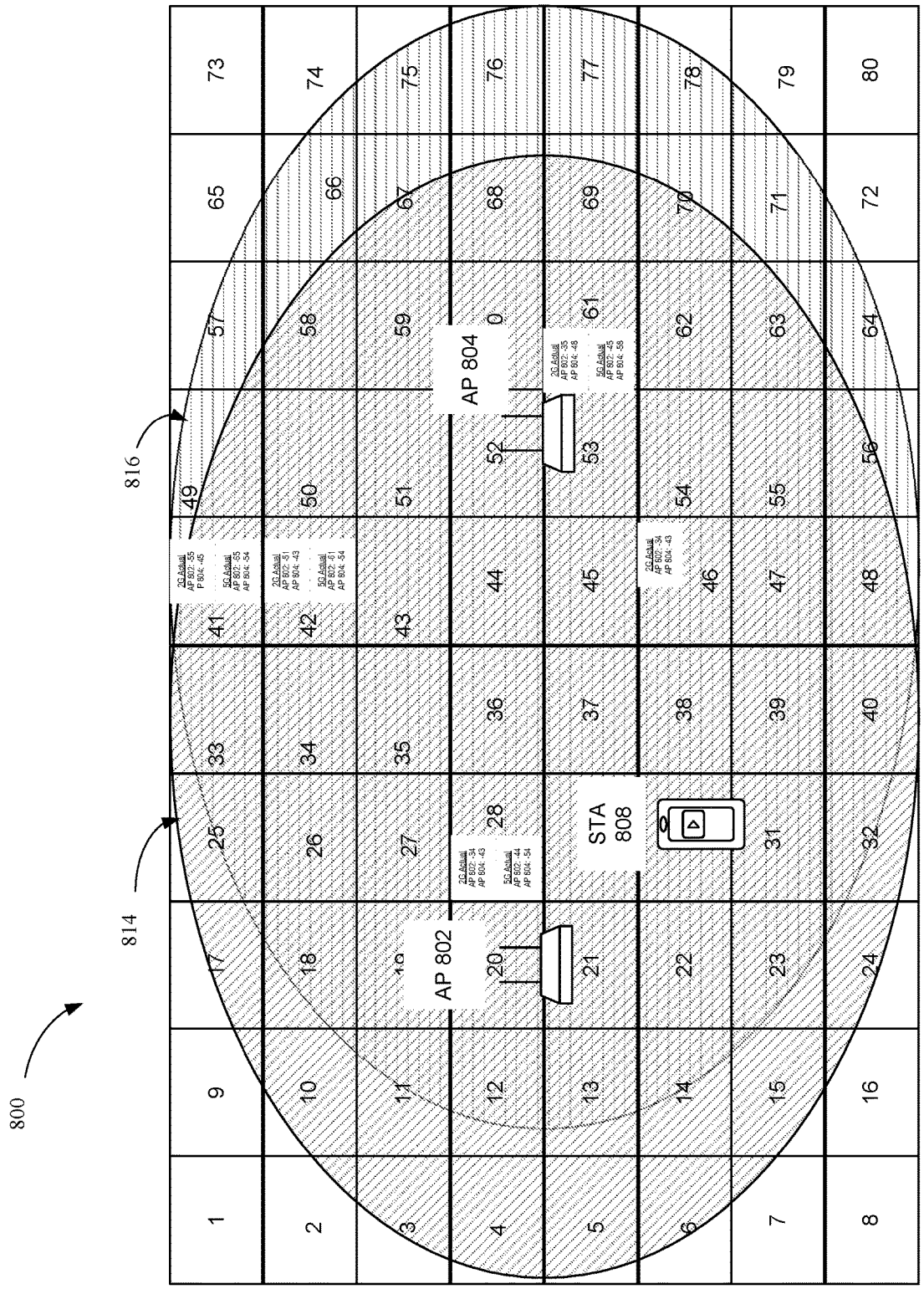
FIG. 8A shows an example of a multi-AP environment having a first AP and a second AP respectively associated with a first segmented coverage area and a second segmented coverage area.

FIG. 8A shows an example of a multi-AP environment 800 having a first AP 802 and a second AP 804 respectively associated with a first segmented coverage area 814 and a second segmented coverage area 816. FIG. 8A shows that measurement values for STA 808 for regions 28, 41, 42, 46, and 61 for a first frequency band (a 2.4 GHz band in this example) have been collected. For example, these measurement values may have been collected when the STA 808, operating in the first frequency band, first became eligible for steering in these regions. FIG. 8A further shows that that measurement values for the STA 808 for regions 28, 41, 42, and 61 for a second frequency band (a 5 GHz band in this example) have been collected. A measurement value for region 46 for the second frequency band is currently unavailable.

In some aspects, the first AP 802, such as the MAP controller thereof, may estimate the measurement value of a region for a first frequency band using the measurement value of that region for a second frequency band. In some implementations, the first AP 802 may estimate the measurement value of a region for a first frequency band using the measurement value of that region for a second frequency band by comparing the measurement values for the first frequency band and the second frequency band in other regions. For instance, in the example of FIG. 8B, the first AP 802 may ascertain, determine, or establish that the actual measurement values of regions 28, 41, 42, and 61 for the 2.4 GHz frequency band, on average, are about 10 dBm greater than the actual measurement values for the 5 GHz frequency band. In view of this relationship in other regions, the first AP 802 may estimate that the measurement value for the 5 GHz band in a given region is likely 10 dBm less than the actual measurement value of that region for the 2.4 GHz frequency band.

Figure 8B:
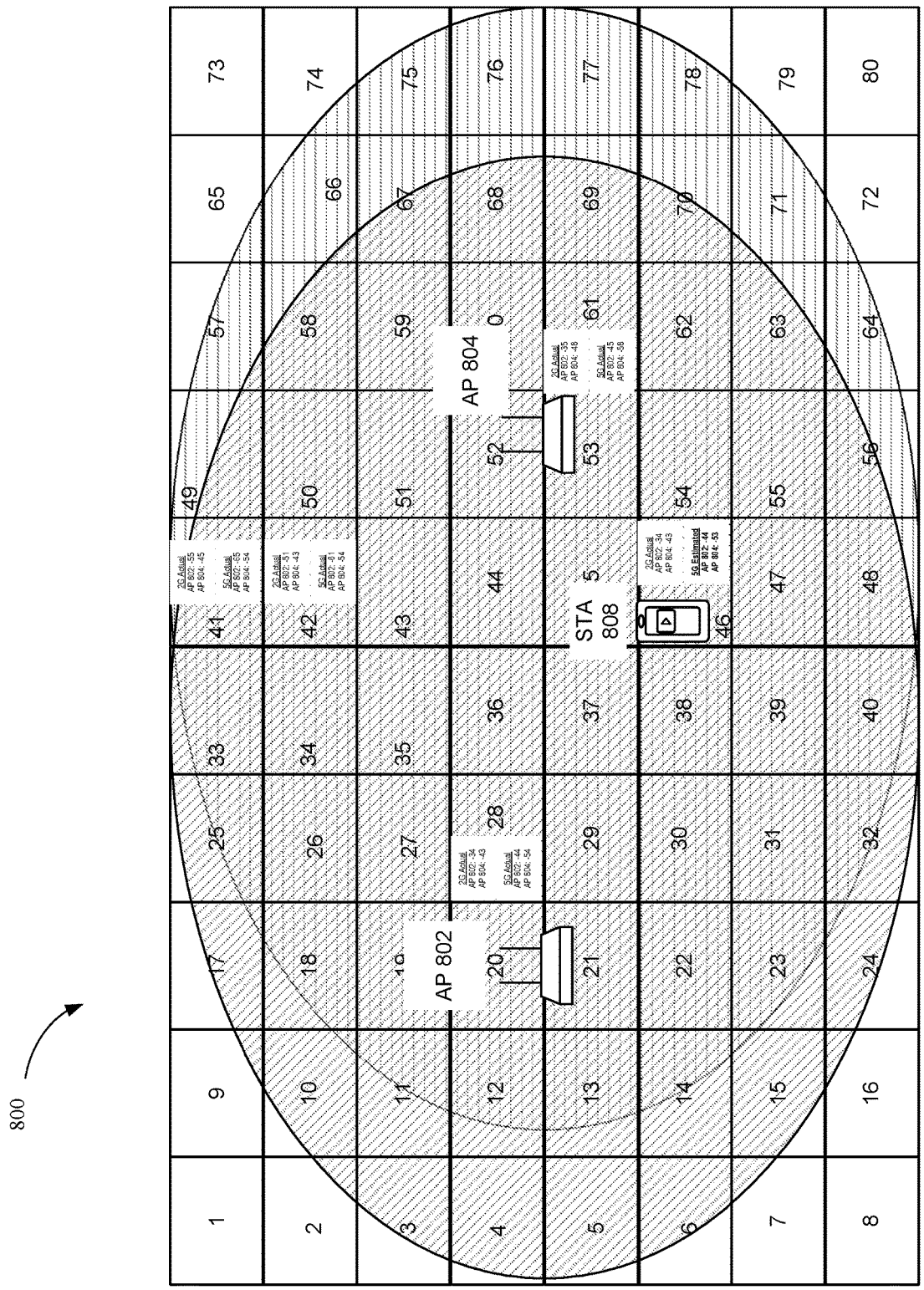
FIG. 8B shows an example of a measurement value of a region for a first frequency band being used to estimate a measurement value of that region for a second frequency band.

FIG. 8B shows an example of the measurement value of region 46 for the first (the 2.4 GHz frequency band in this example) being used to estimate a measurement value of that region for a second frequency band (the 5 GHz frequency band in this example). Specifically, FIG. 8B shows the STA 808 is in region 46. Region 46 is shown to have a measurement value associated with the 2.4 GHz band but may not have a prior measurement value associated with the 5 GHz band. The STA 808 may be operating in the 5 GHz band and may be eligible for steering. However, instead of generating a measurement request and report for the 5 GHz band in region 46, the first AP 802 may estimate that the measurement value for the 5 GHz band in region 46 is 10 dBm less than the measurement value for the 2.4 GHz band in that region. The AP 802 may thus use the relationship between the actual measurement values for a first frequency band and a second frequency band in other regions to estimate the measurement value of the instant region.

In some implementations, the first AP 802 may employ an RSSI conversion parameter configured by the manufacturer of the STA or by a user to ascertain, determine, or establish the measurement value of a region for a first frequency band using the measurement value for a second frequency band. For instance, the RSSI conversion parameter may indicate that the difference between the RSSI of the STA in the first frequency band is 10 dBm greater than the RSSI of that STA in the second frequency band. In these examples, the first AP 802 may use the measurement value (such as the actual measurement value or an estimated measurement value) of a region for the first frequency band to estimate the measurement value of the second frequency band, and vice versa.

As described, the size and number of the segmented regions may, in examples, be user-configurable. In an aspect, the first AP 802 may modify the size of one or more regions. An excessive number of regions of the segmented coverage areas 814 and 816 may add complexity to the environment 800 and degrade steering characteristics. In some implementations, the first AP 808 may merge neighboring regions together in examples in which the neighboring regions have the same or comparable measurement values. Such may allow for the size and number of regions to be optimized and may avoid scenarios in which many small neighboring regions have the same or comparable measurement values.

Figure 9:
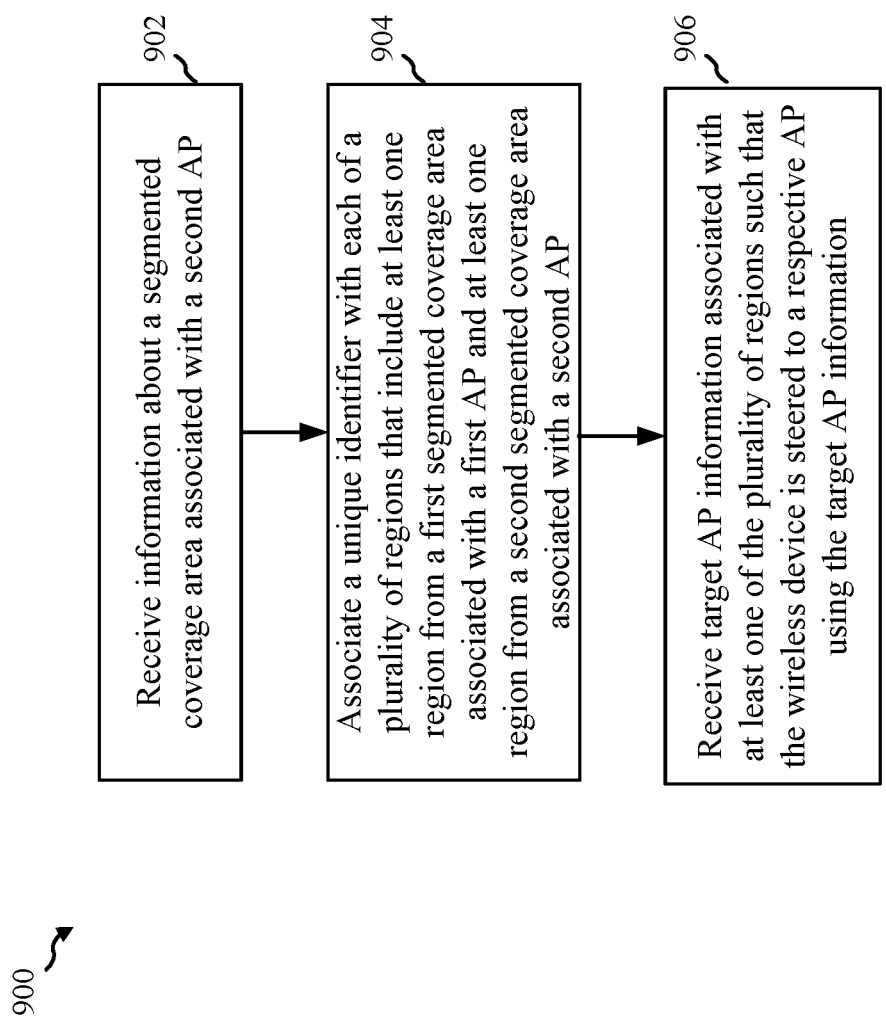
FIG. 9 shows a flowchart illustrating an example process performable at a wireless AP that supports steering an STA using target AP information of a region.

FIG. 9 shows a flowchart illustrating an example process 900 performable at a wireless AP that supports steering an STA using target AP information of a region. The operations of the process 900 may be implemented by the wireless AP or its components as described herein. For example, the process 900 be performed by a wireless communication device, such as the wireless communication device 110 described with reference to FIG. 1A, operating as or within a wireless AP. In some examples, the process 900 may be performed by a wireless AP such as one of the APs 202, 302, 402, 502, 602, 702, or 802 described respectively with reference to FIGS. 2A, 3A, 4A, 5A, 6A, 7A, and 8A, or another suitable AP. In implementations, the wireless AP may include a MAP controller and a MAP agent. In some cases, the multi-AP environment may be a SON and the wireless AP may be any AP in the SON environment.

At block 902, the wireless (or the "first") AP may receive information about a segmented coverage area associated with a second AP. The segmented coverage area associated with a second AP may be, for example, the segmented coverage area 208 associated with the second AP 204 described with reference to FIG. 2C or another segmented coverage area. At block 904, the first AP may associate a unique identifier with each of a plurality of regions. The plurality of regions may include at least one region from a first segmented coverage area associated with the first AP and at least one region from a second segmented coverage area associated with a second AP. At block 906, the first AP may receive target AP information associated with at least one of the plurality of regions such that the wireless device is steered to a respective AP using the target AP information.

While FIG. 9 illustrates the process to steer one STA, multiple STAs may be steered at once using target AP information associated with regions in which the STAs are eligible for steering. In some implementations, the target AP information may be stored remotely (such as on cloud servers) in addition to or as opposed to on the root AP. In some implementations, the steering decisions may be made using the target AP information by these cloud servers or another computing device instead of the MAP controller or an AP.

Figure 10:
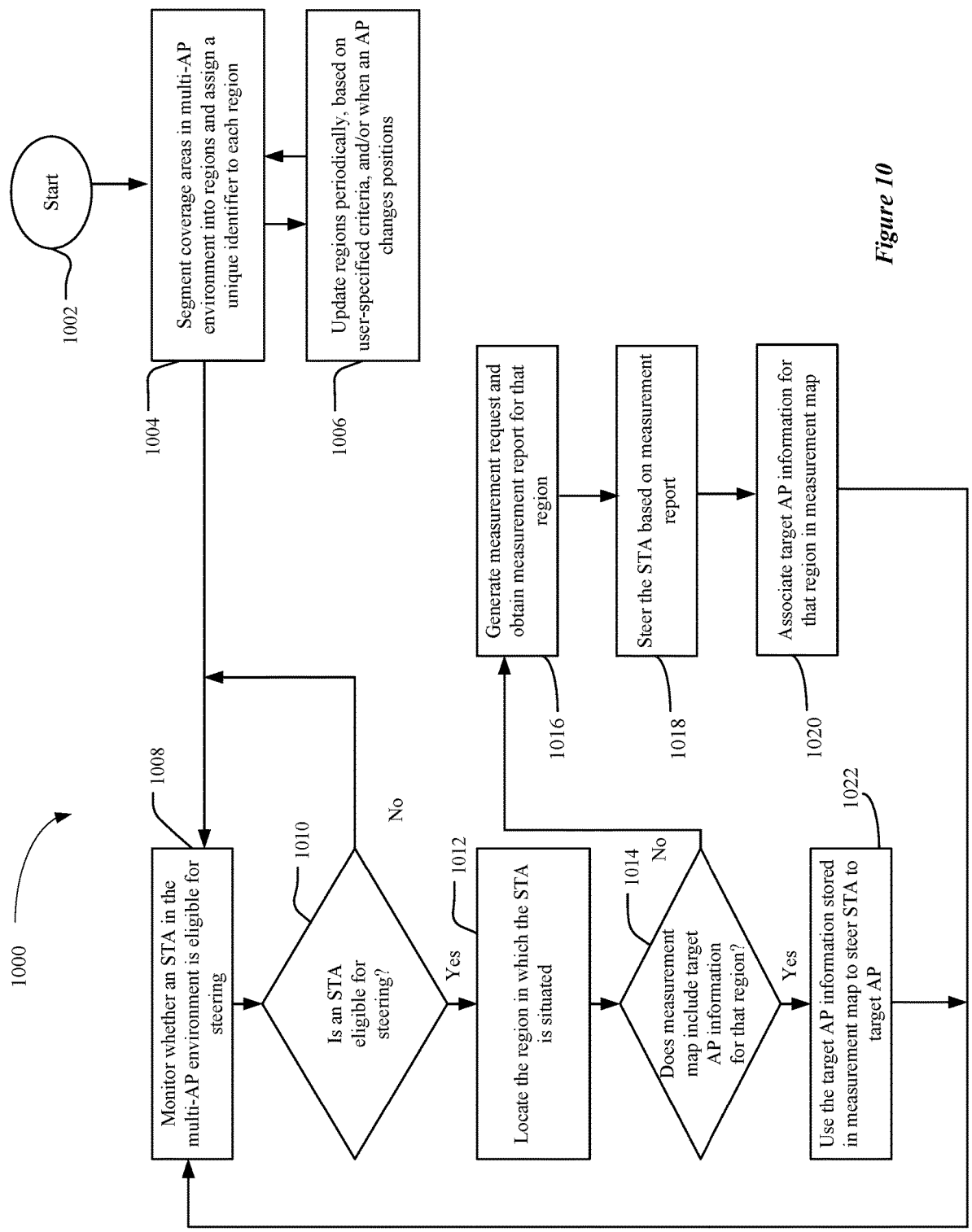
FIG. 10 shows a flowchart illustrating an example process for steering an STA in a multi-AP environment using target AP information of a region.

FIG. 10 shows a flowchart illustrating an example process for steering an STA in a multi-AP environment using target AP information of a region. The operations of the process 1000 may be implemented by one or more wireless APs or their components as described herein.

The process 1000 may start at block 1002. At block 1004, the coverage areas of the multiple APs in the multi-AP environment may be segmented into regions and a first AP (such as a MAP controller associated therewith) may associate a unique identifier with each region. Periodically, or using user-specified criteria, the regions may be updated at block 1006. The regions may also be updated at block 1006 in cases in which one or more APs is moved from its original position.

At block 1008, an AP (such as the associated AP) may monitor whether an STA in the multi-AP environment is eligible for steering. For example, the first AP or the associated AP may check whether the signal strength of the associated AP has gone below or is equal to the steering eligibility threshold. At block 1010, if the STA is not eligible for steering, the process may return to block 1008 and continue monitoring the STA. Alternately, if at block 1010 the STA is eligible for steering, at block 1012 the first AP or the associated AP may locate the region in which the STA is currently situated. For example, the first AP or the associated AP may ascertain, determine, or obtain the location of the STA using one or more of RTT measurements, measurements taken from a global positioning system (GPS), or other sensor associated with the STA, Wi-Fi sensing, and the IEEE 802.11mc protocol.

At block 1014, the first AP or the associated AP may ascertain, determine, or establish whether target AP information for the region in which the STA is currently located is available in a measurement map. If the target AP information for that region is not available, at block 1016 the associated AP may send a measurement request and may obtain the measurement report generated by the STA in response (such as 11k requests and reports or other reports indicating the signal strength of the AP in the region). At block 1018, the first AP or the associated AP may steer the STA using the measurement report. (Using the steering threshold, for example). At block 1020, target AP information, such as information indicating the respective signal strengths of the multiple APs in the region, may be associated with that region in the measurement map. The process 1000 may return to block 1008 for monitoring when the STA is subsequently eligible for steering.

Alternately, if at block 1014 the target AP information for the region is included in the measurement map, the first AP or the associated AP may use the target AP information in the measurement map to steer the STA to the target AP at block 1022. In some examples, the STA may be steered from the associated AP to the target AP in cases in which the signal strength of the target AP is greater than the signal strength of the associated AP. In some examples, the STA may be steered from the associated AP to the target AP when the signal strength of the target AP is greater than the signal strength of the associated AP and the difference between the signal strengths of the target AP and the associated AP exceeds a steering threshold. The process 1000 may return to block 1008 for monitoring whether an STA is eligible for steering.

Figure 11:
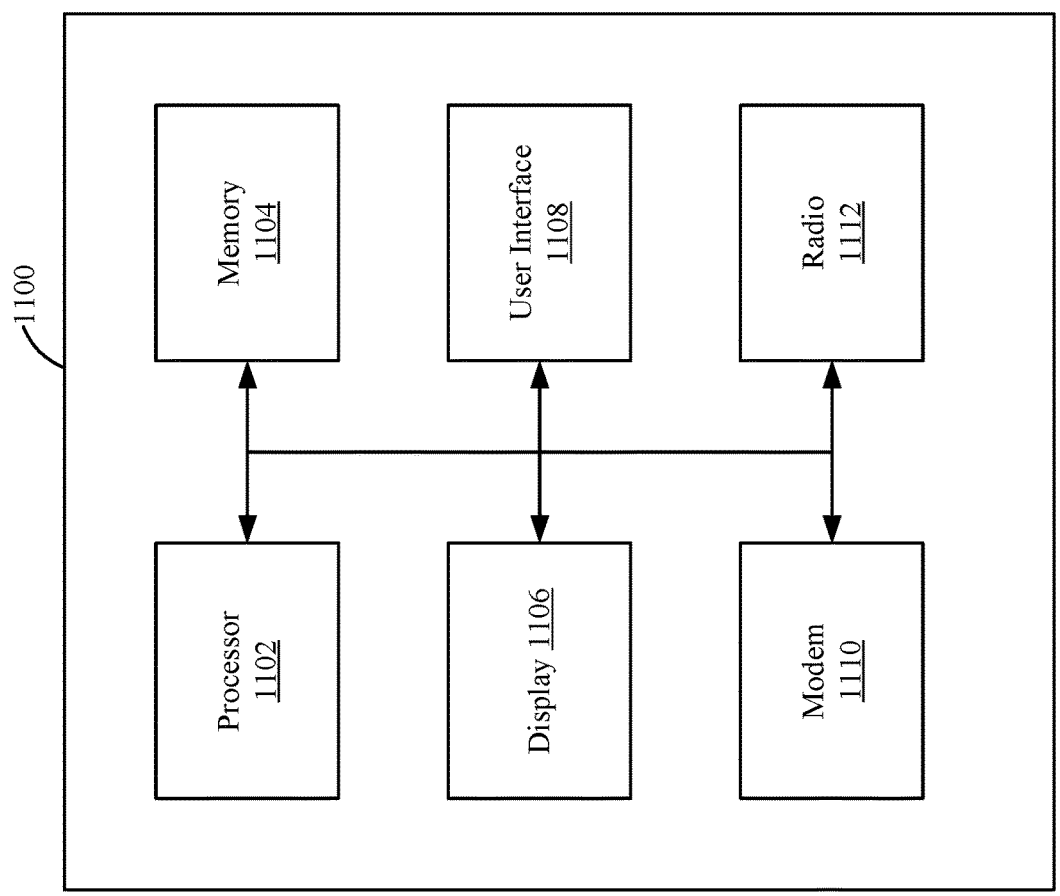
FIG. 11 shows a block diagram of an example wireless communication device that supports steering using target AP information.

FIG. 11 shows a block diagram of an example wireless communication device 1100 that supports steering using target AP information. In some examples, the wireless communication device 1100 is configured or operable to perform all or part of the processes 900 and 1000 described with reference to FIGS. 9 and 10, respectively. In various examples, the wireless communication device 1100 can be a chip, SoC, chipset, package or device that may include: one or more modems (such as a Wi-Fi (IEEE 1102.11) modem or a cellular modem such as 3GPP 4G LTE or 5G compliant modem); one or more processors, processing blocks or processing elements (collectively "the processor" 1102); one or more radios (collectively "the radio" 1112); and one or more memories or memory blocks (collectively "the memory" 1104).

The wireless communication device 1100 includes a processor component 1102, a memory component 1104, and display component 1106, a user interface component 1108, a modem component 1110, and a radio component 1112. Portions of one or more of the components 1106, 1108, 1110, and 1112 may be implemented at least in part in hardware or firmware. In some examples, at least some of the components 1106, 1108, 1110, and 1112 of the device 1100 are implemented at least in part by a processor and as software stored in a memory. For example, portions of one or more of the display component 1106, the user interface component 1108, and the modem component 1110 can be implemented as non-transitory instructions (or "code") executable by the processor 1102 to perform the functions or operations of the respective module.

In some implementations, the processor 1102 may be a component of a processing system. A processing system may generally refer to a system or series of machines or components that receives inputs and processes the inputs to produce a set of outputs (which may be passed to other systems or components of, for example, the device 1100). For example, a processing system of the device 1100 may refer to a system including the various other components or subcomponents of the device 1100, such as the processor, or a transceiver, or a communications manager, or other components or combinations of components of the device 1100. The processing system of the device 1100 may interface with other components of the device 1100 and may process information received from other components (such as inputs or signals) or output information to other components. For example, a chip or modem of the device 1100 may include a processing system, a first interface to output information and a second interface to obtain information. In some implementations, the first interface may refer to an interface between the processing system of the chip or modem and a transmitter, such that the device 1100 may transmit information output from the chip or modem. In some implementations, the second interface may refer to an interface between the processing system of the chip or modem and a receiver, such that the device 1100 may obtain information or signal inputs, and the information may be passed to the processing system. A person having ordinary skill in the art will readily recognize that the first interface also may obtain information or signal inputs, and the second interface also may output information or signal outputs.

The processor 1102 is capable of, configured to, or operable to processes information received through the radio 1112 and the modem 1110, and processes information to be output through the modem 1110 and the radio 1112 for transmission through the wireless medium. The processor 1102 may perform logical and arithmetic operations using program instructions stored within the memory 1104. The instructions in the memory 1104 may be executable (by the processor 1102, for example) to implement the methods described herein. In some examples, the processor 1102, together with the memory 1104, are capable of, configured to, or operable to segment network coverage areas into regions and to steer an STA using target AP information associated with these regions.

The memory 1104 is capable of, configured to, or operable to store and communicate instructions and data to and from the processor 1102.

The user interface 1108 may be any device that allows a user to interact with the wireless communication device 1100, such as a keyboard, a mouse, a microphone, et cetera. In aspects, the user interface 1108 may be integrated with the display component 1106 to present a touchscreen.

The modem 1110 is capable of, configured to, or operable to modulate packets and to output the modulated packets to the radio 1112 for transmission over the wireless medium. The modem 1110 is similarly configured to obtain modulated packets received by the radio 1112 and to demodulate the packets to provide demodulated packets.

The radio 1112 includes at least one radio frequency transmitter and at least one radio frequency receiver, which may be combined into one or more transceivers. The transmitter(s) and receiver(s) may be coupled to one or more antennas. In some aspects, the processor 1102, the memory 1104, the modem 1110, and the radio 1112 may collectively facilitate the wireless communication of the wireless communication device 1100 with other wireless communication devices over multiple frequency bands (such as 2.4 GHz, 5 GHz or 6 GHz).

In some examples, the wireless communication device 1100 can be a device for use in an AP, such as one of APs 110, 202, 302, 402, 502, 602, 702, or 802 described respectively with reference to FIGS. 1A, 2A, 3A, 4A, 5A, 6A, 7A, and 8A, or another suitable AP (such as an associated AP or a target AP). In some other examples, the wireless communication device 1100 can be an AP that includes such a chip, SoC, chipset, package or device as well as multiple antennas. The wireless communication device 1100 is capable of transmitting and receiving wireless communications in the form of, for example, wireless packets. For example, the wireless communication device can be configured or operable to transmit and receive packets in the form of physical layer PPDUs and MPDUs conforming to one or more of the IEEE 1102.11 family of wireless communication protocol standards. In some examples, the wireless communication device 1100 also includes or can be coupled with an application processor which may be further coupled with another memory. In some examples, the wireless communication device 1100 further includes at least one external network interface that enables communication with a core network or backhaul network to gain access to external networks including the Internet.

In some examples, the wireless communication device 1100 can be a device for use in a STA, such as any of STA1-STA4 described with reference to FIG. 1A or another STA. In some other examples, the wireless communication device 1100 can be a STA that includes such a chip, SoC, chipset, package or device as well as multiple antennas. The wireless communication device 1100 is capable of transmitting and receiving wireless communications in the form of, for example, wireless packets. For example, the wireless communication device can be configured or operable to transmit and receive packets in the form of physical layer PPDUs and MPDUs conforming to one or more of the IEEE 1102.11 family of wireless communication protocol standards. In some examples, the wireless communication device 1100 also includes or can be coupled with an application processor which may be further coupled with another memory. In some examples, the wireless communication device 1100 further includes a user interface (UI) (such as a touchscreen or keypad) and a display, which may be integrated with the UI to form a touchscreen display. In some examples, the wireless communication device 1100 may further include one or more sensors such as, for example, one or more inertial sensors, accelerometers, temperature sensors, pressure sensors, or altitude sensors.

Implementation examples are described in the following numbered clauses:

1. A method performed by a first access point (AP) in a multi-AP environment, including: receiving information about a second segmented coverage area associated with a second AP; associating a unique identifier with each of a plurality of regions, the plurality of regions including at least one region from a first segmented coverage area associated with the first AP and at least one region from the second segmented coverage area; and receiving target AP information associated with at least one of the plurality of regions; where a wireless device is steered to a respective AP using the target AP information.
2. The method of clause 1, where the target AP information associated with at least one of the plurality of regions includes a signal strength value of the wireless device in the at least one of the plurality of regions with respect to each of the first AP and the second AP.
3. The method of any of clauses 1 or 2, where the first segmented coverage area and the second segmented coverage area have an overlapping portion.
4. The method of any of clauses 1, 2, or 3, further including associating a preliminary identifier with a region of the plurality of regions located in the overlapping portion.
5. The method of any of clauses 1, 2, 3, or 4, further including receiving the target AP information associated with a particular region of the plurality of regions when the wireless device is in the particular region.
6. The method of any of clauses 1, 2, 3, 4, or 5, further including updating at least one of the plurality of regions in response to a shift in position of at least one of the first AP and the second AP.
7. The method of any of clauses 1, 2, 3, 4, 5, or 6, further including assigning the target AP information associated with a particular region of the plurality of regions to a neighboring region.
8. The method of any of clauses 1, 2, 3, 4, 5, 6, or 7, further including assigning the target AP information associated with a particular region to a second wireless device in the particular region based at least in part on a similarity between the wireless device and the second wireless device.
9. The method of any of clauses 1, 2, 3, 4, 5, 6, 7, or 8, further including merging at least two of the plurality of regions based at least in part on the target AP information associated with the at least two of the plurality of regions.
10. The method of any of clauses 1, 2, 3, 4, 5, 6, 7, 8, or 9, further including associating the target AP information with a region of the plurality of regions based at least in part on a measurement report that includes at least one item selected from a group consisting of an 802.11k report and a smart monitor report.
11. The method of any of any of clauses 1, 2, 3, 4, 5, 6, 7, 8, 9, or 10, further including associating at least one of the plurality of regions with the wireless device based at least in part on a location of the wireless device; where the location of the wireless device is associated with at least one item selected from a group consisting of a reading from a Global Positioning System (GPS), an 802.11mc report, and Wi-Fi sensing.
12. An access point (AP), including:
at least one memory; and at least one processor communicatively coupled with the at least one memory and operable to cause the AP to:
receive information about a second segmented coverage area associated with a second AP;
associate a unique identifier with each of a plurality of regions, the plurality of regions including at least one region from a first segmented coverage area associated with the AP and at least one region from the second segmented coverage area; and
receive target AP information associated with at least one of the plurality of regions; where a wireless device is steered to a respective AP using the target AP information.

13. The AP of clause 12, where the target AP information associated with at least one of the plurality of regions includes a signal strength value of the wireless device in the at least one of the plurality of regions with respect to each of the AP and the second AP.

14. The AP of any of clauses 12 or 13, where the first segmented coverage area and the second segmented coverage area have an overlapping portion.

15. The AP of any of clauses 12, 13, or 14, where the at least one processor is further operable to associate a temporary identifier with a region of the plurality of regions located in the overlapping portion.

16. The AP of any of clauses 12, 13, 14, or 15, where the at least one processor is further operable to receive the target AP information associated with a particular region of the plurality of regions when the wireless device is in the particular region.

17. The AP of any of clauses 12, 13, 14, 15, or 16, where the at least one processor is further operable to update at least one of the plurality of regions in response to a shift in position of at least one of the AP and the second AP.

18. The AP of any of clauses 12, 13, 14, 15, 16, or 17, where the at least one processor is further operable to periodically update the plurality of regions.

19. The AP of any of clauses 12, 13, 14, 15, 16, 17, or 18, where a size of one of the plurality of regions is the same as a size of another of the plurality of regions.

20. The AP of any of clauses 12, 13, 14, 15, 16, 17, 18, or 19, where the at least one processor is further operable to assign the target AP information associated with a particular region of the plurality of regions to a neighboring region.

21. The AP of any of clauses 12, 13, 14, 15, 16, 17, 18, 19, or 20, where the at least one processor is further operable to assign the target AP information associated with a particular region to a second wireless device in the particular region based at least in part on a similarity between the wireless device and the second wireless device.

22. The AP of any of clauses 12, 13, 14, 15, 16, 17, 18, 19, 20, or 21, where the at least one processor is further operable to merge at least two of the plurality of regions based at least in part on the target AP information associated with the at least two of the plurality of regions.

23. The AP of any of clauses 12, 13, 14, 15, 16, 17, 18, 19, 20, 21, or 22, where the at least one processor is further operable to associate the target AP information with a region of the plurality of regions based at least in part on a measurement report; where the measurement report includes at least one item selected from a group consisting of an 802.11k report and a smart monitor report.

24. The AP of any of clauses 12, 13, 14, 15, 16, 17, 18, 19, 20, 21, 22, or 23, where:
the at least one processor is further operable to associate at least one of the plurality of regions with the wireless device based at least in part on a location of the wireless device; and
the location of the wireless device is associated with at least one item selected from a group consisting of a reading from a Global Positioning System (GPS), an 802.11mc report, and Wi-Fi sensing.

25. The AP of any of clauses 12, 13, 14, 15, 16, 17, 18, 19, 20, 21, 22, 23, or 24, where the target AP information associated with at least one of the plurality of regions includes a signal strength value of the wireless device in a first frequency band.

26. The AP of clause 25, where the at least one processor is further operable to estimate a target AP value in a second frequency band based on the signal strength value of the wireless device in the first frequency band.

27. The AP of any of clauses 12, 13, 14, 15, 16, 17, 18, 19, 20, 21, 22, 23, 24, 25, or 26, where each of the plurality of unique identifiers is communicated to the second AP.

28. An access point (AP), including:
means for receiving information about a second segmented coverage area associated with a second AP;
means for associating a unique identifier with each of a plurality of regions, the plurality of regions including at least one region from a first segmented coverage area associated with the AP and at least one region from the second segmented coverage area; and
means for receiving target AP information associated with at least one of the plurality of regions;
where a wireless device is steered to a respective AP using the target AP information.

29. The AP of clause 28, where the target AP information associated with at least one of the plurality of regions includes a signal strength value of the wireless device in the at least one of the plurality of regions with respect to each of the AP and the second AP.

30. The AP of any of clauses 28 or 29, where the first segmented coverage area and the second segmented coverage area have an overlapping portion.

31. The AP of any of clauses 28, 29, or 30, where the at least one processor is further operable to associate a temporary identifier with a region of the plurality of regions located in the overlapping portion.

32. The AP of any of clauses 28, 29, 30, or 31, where the at least one processor is further operable to receive the target AP information associated with a particular region of the plurality of regions when the wireless device is in the particular region.

33. The AP of any of clauses 28, 29, 30, 31, or 32, where the at least one processor is further operable to update at least one of the plurality of regions in response to a shift in position of at least one of the AP and the second AP.

34. The AP of any of clauses 28, 29, 30, 31, 32, or 33, where the at least one processor is further operable to periodically update the plurality of regions.

35. The AP of any of clauses 28, 29, 30, 31, 32, 33, or 34, where a size of one of the plurality of regions is the same as a size of another of the plurality of regions.

36. The AP of any of clauses 28, 29, 30, 31, 32, 33, 34, or 35, further comprising means for assigning the target AP information associated with a particular region of the plurality of regions to a neighboring region.

37. The AP of any of clauses 28, 29, 30, 31, 32, 33, 34, 35, or 36, where the at least one processor is further operable to assign the target AP information associated with a particular region to a second wireless device in the particular region based at least in part on a similarity between the wireless device and the second wireless device.

38. The AP of any of clauses 28, 29, 30, 31, 32, 33, 34, 35, 36, or 37, where the at least one processor is further operable to merge at least two of the plurality of regions based at least in part on the target AP information associated with the at least two of the plurality of regions.

39. The AP of any of clauses 28, 29, 30, 31, 32, 33, 34, 35, 36, 37, or 38, where the at least one processor is further operable to associate the target AP information with a region of the plurality of regions based at least in part on a measurement report; where the measurement report includes at least one item selected from a group consisting of an 802.11k report and a smart monitor report.

40. The AP of any of clauses 28, 29, 30, 31, 32, 33, 34, 35, 36, 37, 38, or 39, where:

the at least one processor is further operable to associate at least one of the plurality of regions with the wireless device based at least in part on a location of the wireless device; and the location of the wireless device is associated with at least one item selected from a group consisting of a reading from a Global Positioning System (GPS), an 802.11mc report, and Wi-Fi sensing.

41. The AP of any of clauses 28, 29, 30, 31, 32, 33, 34, 35, 36, 37, 38, 39, or 40, where the target AP information associated with at least one of the plurality of regions includes a signal strength value of the wireless device in a first frequency band.

42. The AP of clause 41, where the at least one processor is further operable to estimate a target AP value in a second frequency band based on the signal strength value of the wireless device in the first frequency band.

43. The AP of any of clauses 28, 29, 30, 31, 32, 33, 34, 35, 36, 37, or 38, 39, 40, 41, or 42, where each of the plurality of unique identifiers is communicated to the second AP.

44. A non-transitory computer-readable medium having instructions stored thereon that when executed by a processor cause the processor to: receive information about a second segmented coverage area associated with a second AP; associate a unique identifier with each of a plurality of regions, the plurality of regions including at least one region from a first segmented coverage area associated with the first AP and at least one region from the second segmented coverage area; and receive target AP information associated with at least one of the plurality of regions; where a wireless device is steered to a respective AP using the target AP information.

45. The non-transitory computer-readable medium of clause 44, where the target AP information associated with at least one of the plurality of regions includes a signal strength value of the wireless device in the at least one of the plurality of regions with respect to each of the first AP and the second AP.

46. The non-transitory computer-readable medium of any of clauses 44 or 45, where the first segmented coverage area and the second segmented coverage area have an overlapping portion.

47. The non-transitory computer-readable medium of any of clauses 44, 45, or 46, where the processor further associates a preliminary identifier with a region of the plurality of regions located in the overlapping portion.

48. The non-transitory computer-readable medium any of clauses 44, 45, 46, or 47, where the processor receives the target AP information associated with a particular region of the plurality of regions when the wireless device is in the particular region.

49. The non-transitory computer-readable medium any of clauses 44, 45, 46, 47, or 48, where the processor updates at least one of the plurality of regions in response to a shift in position of at least one of the first AP and the second AP.

50. The non-transitory computer-readable medium any of clauses 44, 45, 46, 47, 48, or 49, where the processor assigns the target AP information associated with a particular region of the plurality of regions to a neighboring region.

51. The non-transitory computer-readable medium any of clauses 44, 45, 46, 47, 48, 49, or 50, where the processor assigns the target AP information associated with a particular region to a second wireless device in the particular region based at least in part on a similarity between the wireless device and the second wireless device.

52. The non-transitory computer-readable medium any of clauses 44, 45, 46, 47, 48, 49, 50, or 51, where the processor merges at least two of the plurality of regions based at least in part on the target AP information associated with the at least two of the plurality of regions.

53. The non-transitory computer-readable medium any of clauses 44, 45, 46, 47, 48, 49, 50, 51, or 52, where the processor associates the target AP information with a region of the plurality of regions based at least in part on a measurement report that includes at least one item selected from a group consisting of an 802.11k report and a smart monitor report.

54. The non-transitory computer-readable medium any of clauses 44, 45, 46, 47, 48, 49, 50, 51, 52, or 53, where the processor associates at least one of the plurality of regions with the wireless device based at least in part on a location of the wireless device; where the location of the wireless device is associated with at least one item selected from a group consisting of a reading from a Global Positioning System (GPS), an 802.11mc report, and Wi-Fi sensing.

As used herein, the term "determine" or "determining" encompasses a wide variety of actions and, therefore, "determining" can include calculating, computing, processing, deriving, investigating, looking up (such as via looking up in a table, a database or another data structure), inferring, ascertaining, measuring, and the like. Also, "determining" can include receiving (such as receiving information), accessing (such as accessing data stored in memory), transmitting (such as transmitting information) and the like. Also, "determining" can include resolving, selecting, obtaining, choosing, establishing and other such similar actions.

As used herein, a phrase referring to "at least one of" a list of items refers to any combination of those items, including single members. As an example, "at least one of: a, b, or c" is intended to cover: a, b, c, a-b, a-c, b-c, and a-b-c. As used herein, "or" is intended to be interpreted in the inclusive sense, unless otherwise explicitly indicated. For example, "a or b" may include a only, b only, or a combination of a and b.

As used herein, "based on" is intended to be interpreted in the inclusive sense, unless otherwise explicitly indicated. For example, "based on" may be used interchangeably with "based at least in part on," "associated with", or "in accordance with" unless otherwise explicitly indicated. Specifically, unless a phrase refers to "based on only 'a,'" or the equivalent in context, whatever it is that is "based on 'a,'" or "based at least in part on 'a,'" may be based on "a" alone or based on a combination of "a" and one or more other factors, conditions or information.

The various illustrative components, logic, logical blocks, modules, circuits, operations and algorithm processes described in connection with the examples disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the examples described in this disclosure may be readily apparent to persons having ordinary skill in the art, and the generic principles defined herein may be applied to other examples without departing from the spirit or scope of this disclosure. Thus, the claims are not intended to be limited to the examples shown herein, but are to be accorded the widest scope consistent with this disclosure, the principles and the novel features disclosed herein.

Additionally, various features that are described in this specification in the context of separate examples also can be implemented in combination in a single implementation. Conversely, various features that are described in the context of a single implementation also can be implemented in multiple examples separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the examples described above should not be understood as requiring such separation in all examples, and it should be understood that the described program components and systems can generally be integrated together in a single software product or packaged into multiple software products.

What is claimed is:

1. A method performed by a first access point (AP) in a multi-AP environment, comprising:
   receiving information about a second segmented coverage area associated with a second AP, wherein the second segmented coverage area comprises a second plurality of segmented regions within the second segmented coverage area;
   associating a unique identifier with each of a plurality of regions, wherein a first segmented coverage area associated with the first AP comprises a first plurality of segmented regions within the first segmented coverage area, wherein the plurality of regions includes at least one region from the first plurality of segmented regions within the first segmented coverage area and at least one region from the second plurality of segmented regions within the second segmented coverage area; and
   receiving target AP information associated with at least one of the plurality of regions;
   wherein a wireless device is steered to a respective AP using the target AP information.

2. The method of claim 1, wherein the target AP information associated with at least one of the plurality of regions includes a signal strength value of the wireless device in the at least one of the plurality of regions with respect to each of the first AP and the second AP.

3. The method of claim 1, wherein the first segmented coverage area and the second segmented coverage area have an overlapping portion.

4. The method of claim 3, further comprising associating a preliminary identifier with a region of the plurality of regions located in the overlapping portion.

5. The method of claim 1, further comprising receiving the target AP information associated with a particular region of the plurality of regions when the wireless device is in the particular region.

6. The method of claim 1, further comprising updating at least one of the plurality of regions in response to a shift in position of at least one of the first AP and the second AP.

7. The method of claim 1, further comprising assigning the target AP information associated with a particular region of the plurality of regions to a neighboring region.

8. The method of claim 1, further comprising assigning the target AP information associated with a particular region to a second wireless device in the particular region based at least in part on a similarity between the wireless device and the second wireless device.

9. The method of claim 1, further comprising merging at least two of the plurality of regions based at least in part on the target AP information associated with the at least two of the plurality of regions.

10. The method of claim 1, further comprising associating the target AP information with a region of the plurality of regions based at least in part on a measurement report that includes at least one item selected from a group consisting of an 802.11k report and a smart monitor report.

11. The method of claim 1, further comprising associating at least one of the plurality of regions with the wireless device based at least in part on a location of the wireless device; wherein the location of the wireless device is associated with at least one item selected from a group consisting of a reading from a Global Positioning System (GPS), an 802.11mc report, and Wi-Fi sensing.

12. An access point (AP), comprising:
   at least one memory; and
   at least one processor communicatively coupled with the at least one memory and operable to cause the AP to:
      receive information about a second segmented coverage area associated with a second AP, wherein the second segmented coverage area comprises a second plurality of segmented regions within the second segmented coverage area;
      associate a unique identifier with each of a plurality of regions, wherein a first segmented coverage area associated with the first AP comprises a first plurality of segmented regions within the first segmented coverage area, wherein the plurality of regions includes at least one region from the first plurality of segmented regions within the first segmented coverage area and at least one region from the second plurality of segmented regions within the second segmented coverage area; and receive target AP information associated with at least one of the plurality of regions;

wherein a wireless device is steered to a respective AP using the target AP information.

13. The AP of claim 12, wherein the target AP information associated with at least one of the plurality of regions includes a signal strength value of the wireless device in the at least one of the plurality of regions with respect to each of the AP and the second AP.

14. The AP of claim 12, wherein the first segmented coverage area and the second segmented coverage area have an overlapping portion.

15. The AP of claim 14, wherein the at least one processor is further operable to associate a temporary identifier with a region of the plurality of regions located in the overlapping portion.

16. The AP of claim 12, wherein the at least one processor is further operable to receive the target AP information associated with a particular region of the plurality of regions when the wireless device is in the particular region.

17. The AP of claim 12, wherein the at least one processor is further operable to update at least one of the plurality of regions in response to a shift in position of at least one of the AP and the second AP.

18. The AP of claim 12, wherein the at least one processor is further operable to periodically update the plurality of regions.

19. The AP of claim 12, wherein a size of one of the plurality of regions is the same as a size of another of the plurality of regions.

20. The AP of claim 12, wherein the at least one processor is further operable to assign the target AP information associated with a particular region of the plurality of regions to a neighboring region.

21. The AP of claim 12, wherein the at least one processor is further operable to assign the target AP information associated with a particular region to a second wireless device in the particular region based at least in part on a similarity between the wireless device and the second wireless device.

22. The AP of claim 12, wherein the at least one processor is further operable to merge at least two of the plurality of regions based at least in part on the target AP information associated with the at least two of the plurality of regions.

23. The AP of claim 12, wherein the at least one processor is further operable to associate the target AP information with a region of the plurality of regions based at least in part on a measurement report; wherein the measurement report includes at least one item selected from a group consisting of an 802.11k report and a smart monitor report.

24. The AP of claim 12, wherein:
the at least one processor is further operable to associate at least one of the plurality of regions with the wireless device based at least in part on a location of the wireless device; and
the location of the wireless device is associated with at least one item selected from a group consisting of a reading from a Global Positioning System (GPS), an 802.11mc report, and Wi-Fi sensing.

25. The AP of claim 12, wherein the target AP information associated with at least one of the plurality of regions includes a signal strength value of the wireless device in a first frequency band.

26. The AP of claim 25, wherein the at least one processor is further operable to estimate a target AP value in a second frequency band using the signal strength value of the wireless device in the first frequency band.

27. The AP of claim 12, wherein each of the plurality of unique identifiers is communicated to the second AP.

28. An access point (AP), comprising:
means for receiving information about a second segmented coverage area associated with a second AP, wherein the second segmented coverage area comprises a second plurality of segmented regions within the second segmented coverage area;
means for associating a unique identifier with each of a plurality of regions, wherein a first segmented coverage area associated with the first AP comprises a first plurality of segmented regions within the first segmented coverage area, wherein the plurality of regions includes at least one region from the first plurality of segmented regions within the first segmented coverage area and at least one region from the second plurality of segmented regions within the second segmented coverage area; and
means for receiving target AP information associated with at least one of the plurality of regions;
wherein a wireless device is steered to a respective AP using the target AP information.

29. The access point of claim 28, further comprising means for assigning the target AP information associated with a particular region of the plurality of regions to a neighboring region.

30. The access point of claim 28, wherein the target AP information associated with at least one of the plurality of regions includes a signal strength value of the wireless device in the at least one of the plurality of regions with respect to each of the first AP and the second AP.

* * * * *